United States Patent
Harrison et al.

(10) Patent No.: US 12,040,865 B2
(45) Date of Patent: Jul. 16, 2024

(54) LOW COMPLEXITY MULTI-CONFIGURATION CSI REPORTING

(71) Applicant: Telefonaktiebolaget LM Ericsson (publ), Stockholm (SE)

(72) Inventors: Robert Mark Harrison, Grapevine, TX (US); Mattias Frenne, Uppsala (SE); Shiwei Gao, Nepean (CA); George Jöngren, Sundbyberg (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1661 days.

(21) Appl. No.: 16/090,074

(22) PCT Filed: Mar. 31, 2017

(86) PCT No.: PCT/IB2017/051874
§ 371 (c)(1),
(2) Date: Sep. 28, 2018

(87) PCT Pub. No.: WO2017/168396
PCT Pub. Date: Oct. 5, 2017

(65) Prior Publication Data
US 2023/0093335 A1    Mar. 23, 2023

Related U.S. Application Data

(60) Provisional application No. 62/316,893, filed on Apr. 1, 2016.

(51) Int. Cl.
*H04B 7/06* (2006.01)
(52) U.S. Cl.
CPC ......... *H04B 7/0626* (2013.01); *H04B 7/0617* (2013.01)

(58) Field of Classification Search
CPC ............................ H04L 5/0053; H04W 88/02
(Continued)

(56) References Cited

U.S. PATENT DOCUMENTS

| | | | |
|---|---|---|---|
| 2014/0078919 | A1 | 3/2014 | Hammarwall |
| 2015/0055588 | A1* | 2/2015 | Yerramalli .............. H04L 5/005 370/329 |

(Continued)

FOREIGN PATENT DOCUMENTS

| | | | |
|---|---|---|---|
| CN | 102006624 A | 4/2011 | |
| CN | 103229578 A | 7/2013 | |

(Continued)

OTHER PUBLICATIONS

LG Electronics, "R1-160612: Discussion on RI inheritance in FD-MIMO," 3GPP TSG RAN WG1 Meeting #84, Feb. 6, 2016, 6 pages.

(Continued)

*Primary Examiner* — Kiet M Doan
(74) *Attorney, Agent, or Firm* — Withrow & Terranova, PLLC

(57) ABSTRACT

Systems and methods for low complexity multi-configuration Channel State Information (CSI) reporting are provided. In some embodiments, a method of operating a wireless device in a cellular communications network to provide CSI feedback from multiple CSI reporting configurations is provided. The method includes receiving a first and second CSI reporting configuration and then reporting updated CSI in a CSI report for only one of the first CSI reporting configuration and the second CSI reporting configuration. In this way, rich CSI feedback with many ports, different codebooks, mixed beamformed and non-precoded CSI-RS configurations, etc., can be supported while requiring less computational complexity in the wireless device.

25 Claims, 17 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0092907 A1 | 4/2015 | Dong et al. | |
| 2016/0007340 A1* | 1/2016 | Park | H04B 7/0626 370/329 |
| 2017/0294950 A1* | 10/2017 | Kim | H04W 72/02 |
| 2017/0339679 A1* | 11/2017 | Lee | H04W 72/23 |
| 2017/0366996 A1* | 12/2017 | Park | H04W 24/10 |
| 2017/0366998 A1* | 12/2017 | Lee | H04L 25/0204 |
| 2018/0020430 A1* | 1/2018 | Aiba | H04L 5/0053 |

FOREIGN PATENT DOCUMENTS

| | | |
|---|---|---|
| CN | 103582003 A | 2/2014 |
| EP | 2677671 A1 | 12/2013 |
| EP | 2824849 A1 | 1/2015 |
| EP | 2824891 A1 | 1/2015 |
| JP | 2015512217 A | 4/2015 |
| JP | 2015521420 A | 7/2015 |
| WO | 2012087066 A2 | 6/2012 |
| WO | 2013169197 A1 | 11/2013 |
| WO | 2017078601 A1 | 5/2017 |

OTHER PUBLICATIONS

Samsung, "R1-151640: Discussion on enhancements related to hybrid CSI-RS schemes," 3GPP TSG RAN WG1 Meeting #80, Apr. 24, 2015, 2 pages.

Samsung, "R1-160534: Handling Collision Between Non-Precoded Type and Beam Formed type CSI Reports," 3GPP TSG RAN WG1 Meeting #84, Feb. 5, 2016, 5 pages.

Notice of Reasons for Rejection for Japanese Patent Application No. 2018-55169, dated Nov. 26, 2019, 6 pages.

Second Office Action for Chinese Patent Application No. 201780034090.8, dated Jun. 15, 2021, 20 pages.

Third Office Action for Chinese Patent Application No. 201780034090.8, dated Dec. 2, 2021, 21 pages.

Examination Report for European Patent Application No. 17717506.4, dated May 6, 2021, 4 pages.

Samsung, "R1-151640: Discussion on enhancements related to hybrid CSI-RS schemes," 3GPP TSG RAN WG1 Meeting #80bis, Apr. 20-24, 2015, Belgrade, Servia, 2 pages.

Examination Report for European Patent Application No. 17717506.4, dated Mar. 20, 2020, 5 pages.

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.

Author Unknown, "Technical Specification Group Radio Access Network; Evolved Universal Terrestrial Radio Access (E-UTRA); Physical layer procedures (Release 13)," Technical Specification 36.213, Version 13.0.1, 3GPP Organizational Partners, Jan. 2016, 326 pages.

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.0.0, 3GPP Organizational Partners, Dec. 2015, 507 pages.

Ericsson, "R1-157202: Final details of measurement restriction," Third Generation Partnership Project (3GPP), TSG-RAN WG1 #83, Nov. 16-20, 2015, 4 pages, Anaheim, USA.

International Search Report and Written Opinion for International Patent Application No. PCT/IB2017/051874, dated Jun. 30, 2017, 15 pages.

Written Opinion for International Patent Application No. PCT/IB2017/051874, dtaed Apr. 10, 2018, 7 pages.

International Preliminary Report on Patentability for International Patent Application No. PCT/IB2017/051874, dated Jul. 4, 2018, 22 pages.

* cited by examiner

LOW COMPLEXITY MULTI-CONFIGURATION CSI REPORTING

RELATED APPLICATIONS

This application claims the benefit of provisional patent application Ser. No. 62/316,893, filed Apr. 1, 2016, the disclosure of which is hereby incorporated herein by reference in its entirety.

TECHNICAL FIELD

The present disclosure relates to low complexity multi-configuration Channel State Information (CSI) reporting.

BACKGROUND

Non-precoded and beamformed Channel State Information Reference Signal (CSI-RS) operation is supported through CSI processes and/or CSI-RS resources configured as 'Class A', or 'Class B', respectively. Dynamic beamforming is supported by channel measurement restriction which restricts the UE to measure CSI-RS in one subframe only, so that the User Equipment (UE) won't average CSI when the beamforming on the CSI is changing across subframes. Channel measurement restriction is only supported for Class B operation in Long Term Evolution (LTE) Rel-13.

A UE configured for Class B operation can be configured with up to 8 CSI-RS resources, with up to 8 ports in each CSI resource, in one CSI process in LTE Rel-13. Such a UE can be configured to report a CSI-RS Resource Indicator (CRI) to indicate which of the CSI-RS resources it will best be served upon. The UE then provides Channel Quality Indicators (CQI), Rank Indicators (RI), and/or Precoding Matrix Indicators (PMI) only for the best CSI-RS resource.

A UE configured for Class B operation with 1 CSI-RS resource may use a port selection and cophasing codebook wherein the UE selects a subset of the CSI-RS ports and cophasing coefficients that combine the selected ports. This is identified in the layer 1 LTE specs with 'altenativeCodebookEnabledCLASSB_K1', and has been referred to as a 'W2-only' codebook in LTE contributions in 3GPP RAN1.

When a large number of CSI-RS ports are used for Class A or Class B operation, the overhead may be significant. One approach that was proposed to reduce this overhead was to transmit many Class A CSI-RS ports infrequently, and a few Class B CSI-RS ports frequently. The UE feedback from Class A is used to select the beams applied to the Class B CSI-RS. This use of both Class A and Class B CSI-RS is called 'Hybrid' CSI reporting. By using Class A to measure the channel to each element of the array, the beamforming weights used for Class B can be determined accurately and with low evolved node B (eNB) complexity. The use of Class B with a small number of ports allows reduced CSI feedback overhead and limits UE CSI computational complexity.

It is possible to support Hybrid CSI reporting using two CSI processes in LTE Rel-13, where a first process is configured with Class A and a second is configured with Class B. However, two CSI processing capability is more complex for the UE than single CSI process reporting, since the UE must be able to calculate CSI for two reports, rather than one.

Hybrid CSI-RS reporting requires a UE to transmit Class A and Class B reports, and doing so within one CSI process would mean that new reporting mechanisms are needed.

UEs configured with two CSI processes often need to compute twice as much CSI. This is especially the case for aperiodic reporting where eNB can request a CSI report for either or both CSI processes in a given subframe, and the CSI reports do not have a fixed periodicity that can be used to separate the CSI reports to reduce the CSI computational complexity.

As such, systems and methods for providing CSI feedback from multiple CSI reporting configurations are needed.

SUMMARY

Systems and methods for low complexity multi-configuration Channel State Information (CSI) reporting are provided. In some embodiments, a method of operating a wireless device in a cellular communications network to provide CSI feedback from multiple CSI reporting configurations is provided. The method includes receiving a first and second CSI reporting configuration and then reporting updated CSI in a CSI report for only one of the first CSI reporting configuration and the second CSI reporting configuration. In this way, rich CSI feedback with many ports, different codebooks, mixed beamformed and non-precoded Channel State Information Reference Signal (CSI-RS) configurations, etc., can be supported while requiring less computational complexity in the wireless device.

According to some embodiments, a wireless device is configured with multiple CSI reporting configurations, but constraints are used such that the wireless device need only compute one CSI report at a time. A CSI configuration can be a CSI process, or it can be a CSI-RS configuration and associated parameters such as codebook configurations, quasi-collocation information, etc.

In some embodiments (potentially well-suited for CSI periodic reporting), a wireless device is configured with a subordinate CSI configuration that is associated with a primary CSI configuration. Reporting for the primary CSI configuration takes precedence over the subordinate configuration, such that the wireless device is not required to update and/or report subordinate CSI if primary CSI has been recently updated and/or reported.

In some embodiments (potentially well-suited for aperiodic CSI reporting), the eNB requests a CSI report for a CSI process, and the wireless device is required to provide a number of CSI reports smaller than the number it is configured for, according to how many subordinate CSI processes it can support.

In an alternative approach (potentially well-suited for aperiodic CSI reporting), the eNB requests a CSI report for a CSI resource, where multiple CSI resources can be associated with a single CSI process.

As exemplary advantages to the features described herein, rich CSI feedback with many ports, different codebooks, mixed beamformed and non-precoded CSI-RS configurations, etc., can be supported while requiring less computational complexity in the wireless device.

A wireless device is only required to compute one set of CSI at a time, rather than two sets at a time, as it would if it were e.g. configured with a Class A and a Class B CSI process.

Rel-13 CSI reporting mechanisms can be largely reused. There is no need for new Physical Uplink Control Channel (PUCCH) reporting types, timing offsets, periodicities, etc. Rel-13 CSI process structure can be used without having to define e.g. a hybrid CSI-RS process.

Any combination of CSI reporting configurations is possible, such as combinations of Class A and B, two Class A or two Class B CSI processes, different numbers of ports in the CSI processes, different codebook types, etc.

Existing wireless device capabilities can be easily extended by defining a number of subordinate CSI processes that the wireless device can support when supporting a given total number of CSI processes. Also, eNB transmit power and CSI-RS overhead can be reduced by transmitting fewer CSI-RS ports most of the time and through CSI-RS beamforming gain.

In some embodiments, a method of operating a wireless device in a cellular communications network to provide CSI feedback from multiple CSI reporting configurations includes determining a first time instant corresponding to the first CSI reporting configuration and a second time instant corresponding to the second CSI reporting configuration. The method includes calculating the CSI report using the second CSI reporting configuration if the first time instant is not between the second time instant and a third time instant, where the third time instant is later than the second time instant.

In some embodiments, determining the first time instant includes determining the first time instant as one of a time instant that contains a first CSI reference resource and a transmission time for a first CSI report.

In some embodiments, determining the second time instant includes determining the second time instant as one of a time instant that contains a second CSI reference resource and a transmission time for a second CSI report.

In some embodiments, the third time instant is one of a time instant when the wireless device (14) transmits the CSI report and a predetermined length after the second time instant, the predetermined length of time being at least one subframe.

In some embodiments, determining the first time instant includes determining the first time instant as the time instant that contains the first CSI reference resource; determining the second time instant includes determining the second time instant as the time instant that contains the second CSI reference resource; and the third time instant is the time instant when the wireless device transmits the CSI report.

In some embodiments, determining the first time instant includes determining the first time instant as the transmission time for the first CSI report; determining the second time instant includes determining the second time instant as the transmission time for the second CSI report; and the third time instant is the predetermined length after the second time instant, the predetermined length of time being at least one subframe. In some embodiments, the predetermined length of time is $(n_{cqi\_ref}-1)$ subframes such that the third time instant is $(n_{cqi\_ref}-1)$ subframes after the second time instant.

In some embodiments, receiving the first CSI reporting configuration includes receiving a first CSI resource for a CSI process of the wireless device, and receiving the second CSI reporting configuration includes receiving a second CSI resource for the CSI process of the wireless device. In some embodiments, the method also includes receiving a CSI report request for either the first CSI reporting configuration or the second CSI reporting configuration and reporting the CSI report for the one of the first CSI reporting configuration and the second CSI reporting configuration according to the CSI report request.

In some embodiments, receiving a value of "10" indicates that the CSI report request is for the first CSI reporting configuration. Receiving a value of "11" indicates that the CSI report request is for the second CSI reporting configuration.

In some embodiments, a port associated with the first CSI reporting configuration and a port associated with the second CSI reporting configuration can always be assumed to be quasi-collocated. In some embodiments, the wireless device does not expect to receive the first CSI reporting configuration and the second CSI reporting configuration that have different values of a higher layer parameter providing quasi-collocation information such as qcl-CRS-Info-r11.

In some embodiments, a method of operating a wireless device in a cellular communications network includes reporting a first number of CSI reports for which the wireless device can be configured on a serving cell and reporting a second number of CSI reports for which the wireless device can report updated CSI feedback in a reporting period for the serving cell.

In some embodiments, a method of operating a base station in a cellular communications network includes receiving CSI feedback from multiple CSI reporting configurations. The method further includes configuring a wireless device with a first and a second CSI reporting configuration and then receiving a CSI report from the wireless device that is updated for only one of the first CSI reporting configuration and the second CSI reporting configuration.

In some embodiments, a wireless device includes at least one processor and memory. The memory includes instructions executable by the at least one processor whereby the wireless device is operable to receive a first and a second CSI reporting configuration and report an updated CSI report for only one of the first CSI reporting configuration and the second CSI reporting configuration.

In some embodiments, a base station includes at least one processor and memory. The memory includes instructions executable by the at least one processor whereby the network node is operable to configure a wireless device with a first and a second CSI reporting configuration and receive a CSI report from the wireless device for only one of the first CSI reporting configuration and the second CSI reporting configuration.

In some embodiments, a wireless device includes one or more modules operative to receive a first and a second CSI reporting configuration and report an updated CSI report for only one of the first CSI reporting configuration and the second CSI reporting configuration.

In some embodiments, a base station includes one or more modules operative to configure a wireless device with a first and a second CSI reporting configuration and receive an updated CSI report from the wireless device for only one of the first CSI reporting configuration and the second CSI reporting configuration.

Various other features and advantages will become obvious to one of ordinary skill in the art in light of the following detailed description and drawings.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
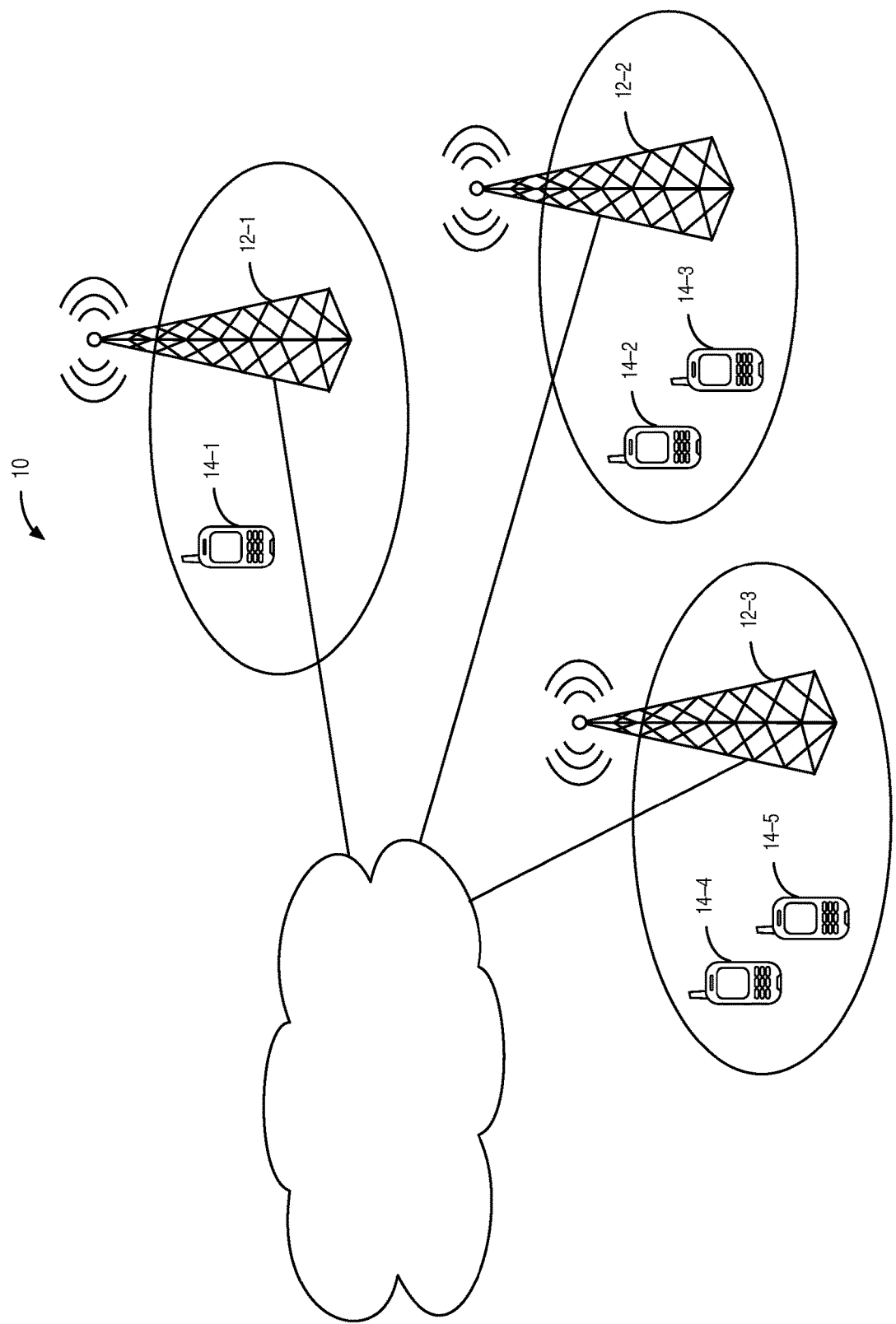
FIG. 1 illustrates a wireless communications network, according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment may be implemented using different combinations of software, firmware, and/or hardware.

As used herein, a network node is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service (QoS), and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform various functions described herein.

Although the described solutions may be implemented in any appropriate type of telecommunication system supporting any suitable communication standards and using any suitable components, particular embodiments of the described solutions may be implemented in a wireless communications network 10 such as is shown in FIG. 1.

As shown in FIG. 1, the example wireless communications network may include one or more radio access nodes 12-1, 12-2, and 12-3, referred to collectively herein as radio access nodes 12 (e.g., evolved Node Bs (eNBs) or other base stations 12) capable of communicating with wireless communication devices along with any additional elements suitable to support communication between wireless communication devices or between a wireless communication device and another communication device (such as a landline telephone)

The example wireless communications network 10 may also include one or more instances of wireless devices 14-1 through 14-5, referred to collectively herein as wireless devices 14 (e.g., conventional User Equipments (UEs), machine type communication (MTC)/machine-to-machine (M2M) UEs). Although the illustrated wireless devices 14 may represent communication devices that include any suitable combination of hardware and/or software, these wireless devices 14 may, in particular embodiments, represent devices such as the example wireless device illustrated in greater detail by FIGS. 15 and 18. Similarly, although the illustrated radio access node 12 may represent network nodes that include any suitable combination of hardware and/or software, these nodes may, in particular embodiments, represent devices such as the example base station 12 illustrated in greater detail by FIGS. 14, 16, and 17.

It is first noted that although terminology from 3GPP Long Term Evolution (LTE) has been used in this disclosure, this should not be seen as limiting the scope to only the aforementioned system. Other wireless systems, including Wideband Code Division Multiple Access (WCDMA), WiMax, Ultra Mobile Broadband (UMB) and Global System for Mobile Communications (GSM), may also benefit from exploiting the ideas covered within this disclosure.

Also note that terminology such as eNB and UE should be considering non-limiting and does in particular not imply a certain hierarchical relation between the two; in general "eNodeB" could be considered as device 1 and "UE" device 2, and these two devices communicate with each other over some radio channel. Herein, the focus is on wireless transmissions in the downlink, but the embodiments are equally applicable in the uplink.

Figure 2:
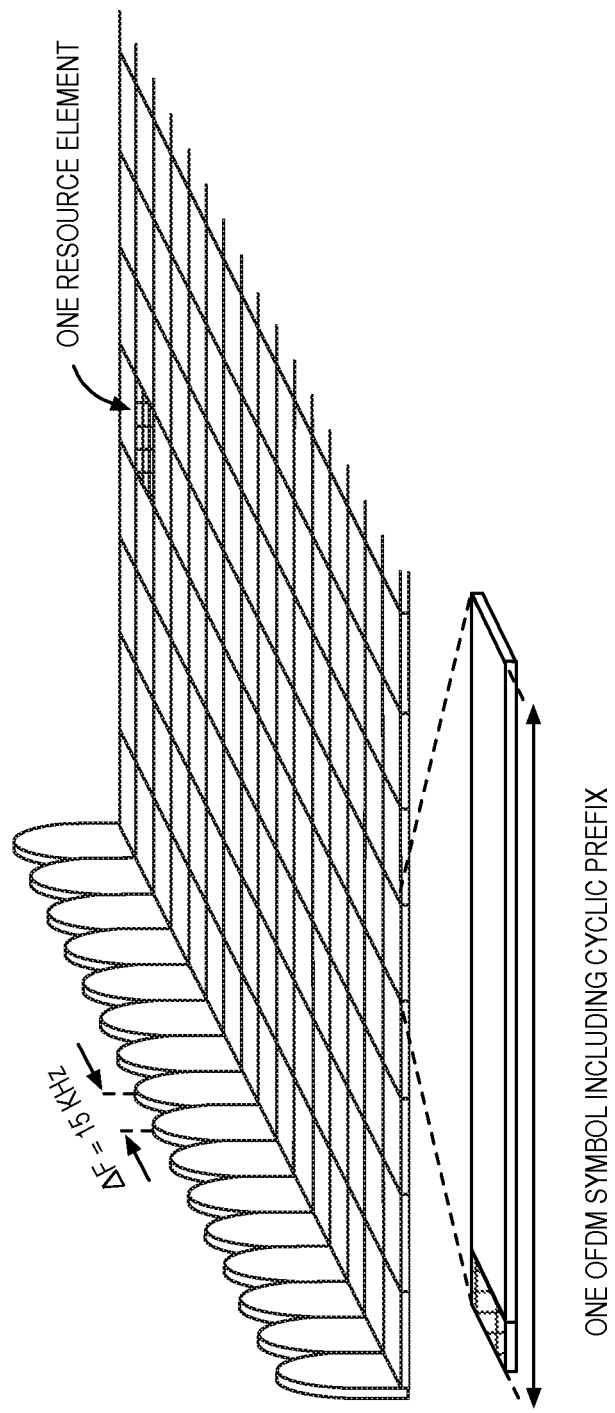
FIG. 2 illustrates a Long Term Evolution (LTE) downlink physical resource, according to some embodiments of the present disclosure.

LTE uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 2, where each resource element corresponds to one OFDM subcarrier during one OFDM symbol interval.

Figure 3:
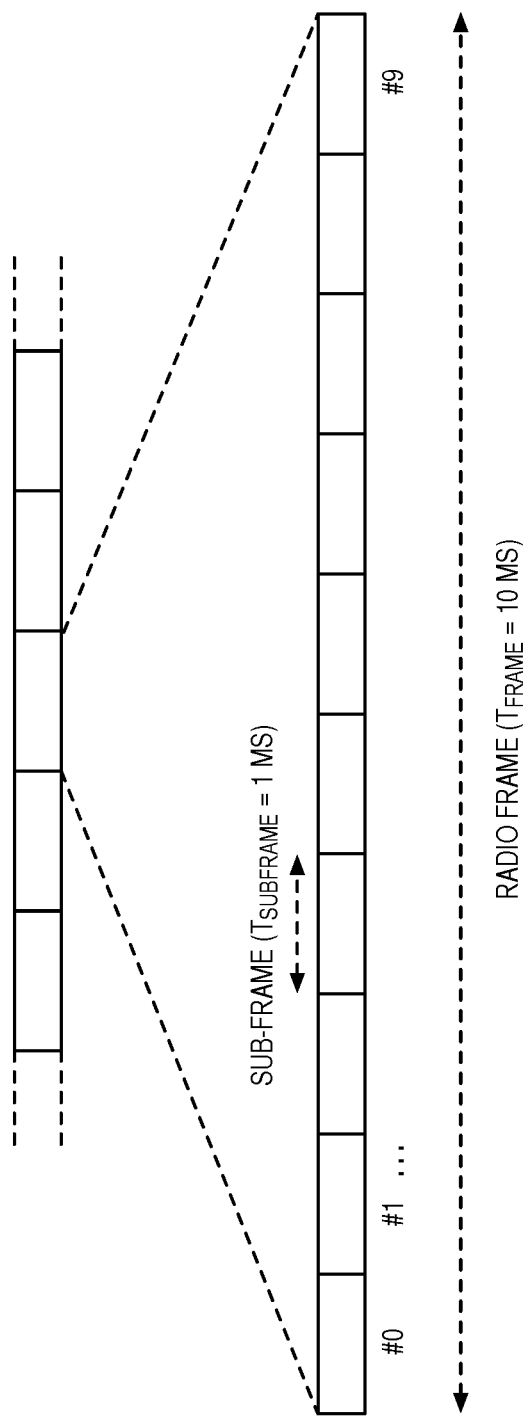
FIG. 3 illustrates an LTE time-domain structure, according to some embodiments of the present disclosure.

In the time domain, LTE downlink transmissions are organized into radio frames of 10 ms, each radio frame consisting of ten equally-sized subframes of length Tsubframe=1 ms as is shown in FIG. 3.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Figure 4:
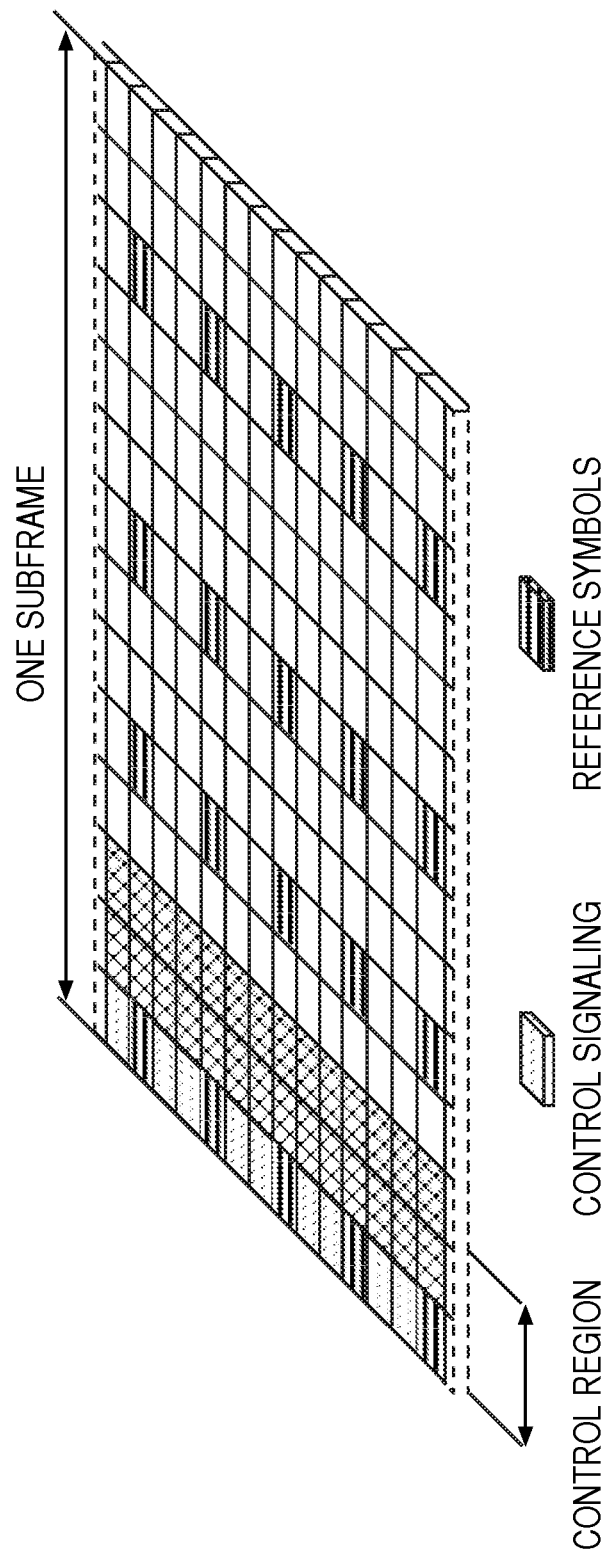
FIG. 4 illustrates reference signals in a downlink subframe, according to some embodiments of the present disclosure.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3, or 4 OFDM symbols in each subframe. A downlink system with 3 OFDM symbols as control is illustrated in FIG. 4.

LTE uses Hybrid Automatic Repeat Request (HARQ), where, after receiving downlink data in a subframe, the terminal attempts to decode it and reports to the base station whether the decoding was successful (ACK) or not (NACK). In case of an unsuccessful decoding attempt, the base station can retransmit the erroneous data.

Uplink control signaling from the terminal to the base station consists of
  HARQ acknowledgements for received downlink data;
  terminal reports related to the downlink channel conditions, used as assistance for the downlink scheduling;
  scheduling requests, indicating that a mobile terminal needs uplink resources for uplink data transmissions.

Figure 5:
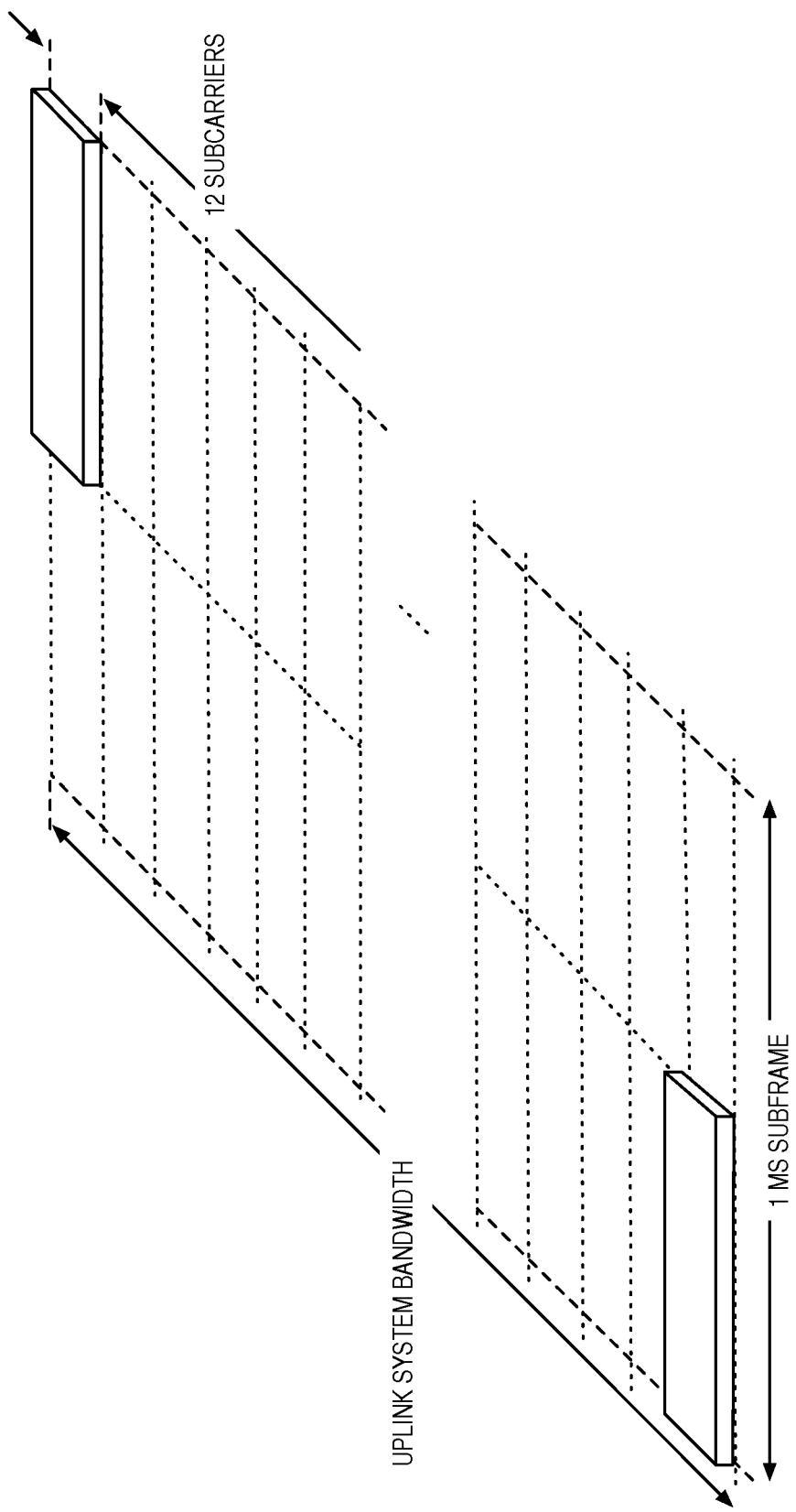
FIG. 5 illustrates a uplink L1/L2 control signaling transmission, according to some embodiments of the present disclosure.

If the mobile terminal has not been assigned an uplink resource for data transmission, the L1/L2 control information (channel-status reports, HARQ acknowledgments, and scheduling requests) is transmitted in uplink resources (resource blocks) specifically assigned for uplink L1/L2 control on a physical uplink control channel (PUCCH). As illustrated in FIG. 5, these resources are located at the edges of the total available cell bandwidth. Each such resource consists of twelve "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g., in case of very large overall transmission bandwidth supporting a large number of users, additional resources blocks can be assigned next to the previously assigned resource blocks.

As mentioned above, uplink L1/L2 control signaling include HARQ acknowledgements, channel-status reports, and scheduling requests. Different combinations of these types of messages are possible as described further below, but to explain the structure for these cases it is beneficial to discuss separate transmission of each of the types first, starting with the HARQ and the scheduling request. There are three formats defined for PUCCH, each capable of carrying a different number of bits. For this discussion, PUCCH format 2 is most interesting.

Channel-status reports are used to provide the base station 12 with an estimate of the channel properties at the terminal in order to aid channel-dependent scheduling. A channel-status report consists of multiple bits per subframe. PUCCH format 1, which is capable of at most two bits of information per subframe, can obviously not be used for this purpose. Transmission of channel-status reports on the PUCCH is instead handled by PUCCH format 2, which is capable of multiple information bits per subframe. There are actually three variants in the LTE specifications, formats 2, 2a, and 2b, where the last two formats are used for simultaneous transmission of HARQ acknowledgements as discussed later in this section. However, for simplicity, they are all referred to as format 2 herein.

The PUCCH format 2 resources are semi-statically configured.

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

Figure 6:
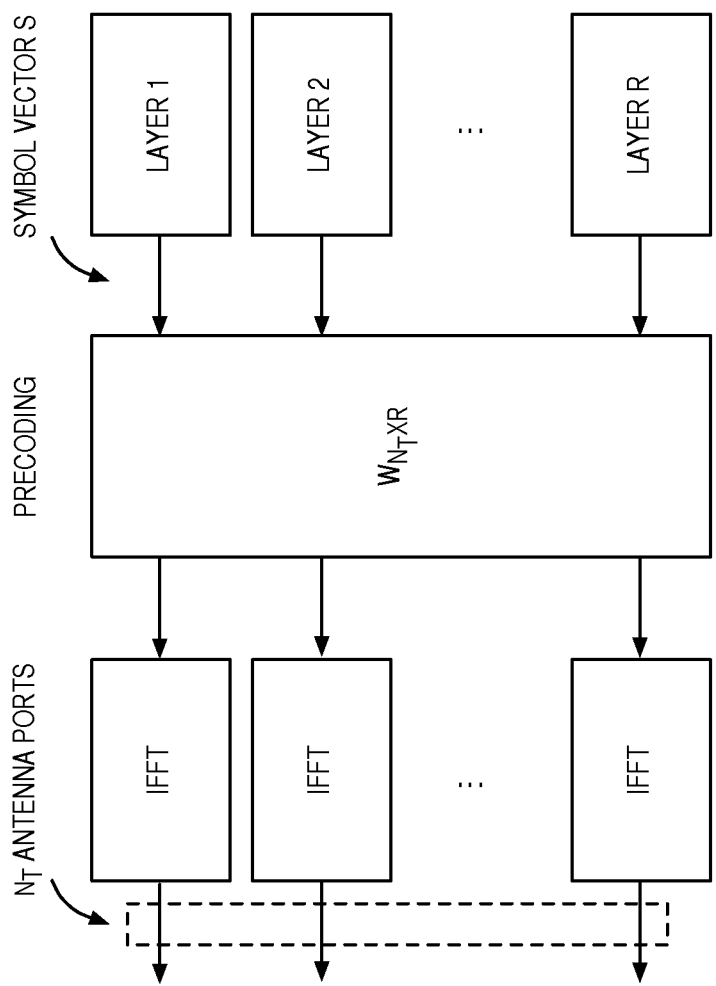
FIG. 6 illustrates a transmission structure for precoded spatial multiplexing, according to some embodiments of the present disclosure.

The LTE standard is currently evolving with enhanced MIMO support. A core component in LTE is the support of MIMO antenna deployments and MIMO related techniques. Currently, LTE-Advanced supports an 8-layer spatial multiplexing mode for 8 Tx antennas with channel dependent precoding. The spatial multiplexing mode is aimed for high data rates in favorable channel conditions. An illustration of the spatial multiplexing operation is provided in FIG. 6.

As seen, the information carrying symbol vector s is multiplied by an $N_T \times r$ precoder matrix w, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder W can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE 14. In addition, the precoder matrix may also be selected to strive for orthogonalizing the channel, meaning that after proper linear equalization at the UE 14, the inter-layer interference is reduced.

The transmission rank, and thus the number of spatially multiplexed layers, is reflected in the number of columns of the precoder. For efficient performance, it is important that a transmission rank that matches the channel properties is selected.

In LTE Release-10, a new reference symbol sequence was introduced for the intent to estimate channel state information, the Channel State Information Reference Signal (CSI-RS). The CSI-RS provides several advantages over basing the CSI feedback on the Common Reference Symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

Two types of CSI-RS are defined in LTE: Non-Zero Power (NZP) and Zero Power (ZP) CSI-RS. NZP CSI-RS can be used to estimate the effective channel of a serving transmission point, while ZP CSI-RS can be used to measure interference, or to prevent interference to other UEs 14 receiving signals in the ZP CSI-RS resource elements. In Rel-13, a UE 14 should not be configured with a ZP CSI-RS that occupies the same resource elements in an OFDM symbol as an NZP CSI-RS configured for the UE 14.

By measuring on a CSI-RS, a UE 14 can estimate the effective channel the CSI-RS is traversing including the radio propagation channel and antenna gains. In more mathematical rigor, this implies that if a known CSI-RS signal x is transmitted, a UE 14 can estimate the coupling between the transmitted signal and the received signal (i.e., the effective channel). Hence if no virtualization is performed in the transmission, the received signal y can be expressed as:

$$y = Hx + e$$

and the UE can estimate the effective channel H.

Up to eight CSI-RS ports can be configured for a Rel. 11 UE 14, that is, the UE 14 can thus estimate the channel from up to eight transmit antennas.

For CSI feedback, LTE has adopted an implicit CSI mechanism where a UE 14 does not explicitly report e.g., the complex valued elements of a measured effective channel, but rather the UE 14 recommends a transmission configuration for the measured effective channel. The recommended transmission configuration thus implicitly gives information about the underlying channel state.

In LTE the CSI feedback is given in terms of a transmission Rank Indicator (RI), a Precoding Matrix Indicator (PMI), and one or two Channel Quality Indicators (CQI). The CQI/RI/PMI report can be wideband or frequency selective depending on which reporting mode that is configured.

The RI corresponds to a recommended number of streams that are to be spatially multiplexed and thus transmitted in parallel over the effective channel. The PMI identifies a recommended precoder (in a codebook which contains precoders with the same number of rows as the number of CSI-RS ports) for the transmission, which relates to the spatial characteristics of the effective channel. The CQI represents a recommended transport block size (i.e., code rate), and LTE supports transmission of one or two simultaneous (on different layers) transmissions of transport blocks (i.e. separately encoded blocks of information) to a UE 14 in a subframe. There is thus a relation between a CQI and an SINR of the spatial stream(s) over which the transport block or blocks are transmitted.

In LTE Release 11, CSI processes are defined such that each CSI process is associated with a CSI-RS resource and a Channel-State Information-Interference Measurement (CSI-IM) resource. A UE 14 in transmission mode can be configured with one or more (up to four) CSI processes per serving cell by higher layers, and each CSI reported by the UE 14 corresponds to a CSI process. A UE 14 may be configured with an RI-reference CSI process for any CSI process, such that the reported RI for the CSI process is the same as for the RI-reference CSI process. This configuration may be used to force a UE 14 to report the same RI for several different interference hypotheses, even though another RI would be the best choice for some hypotheses. Furthermore, a UE 14 is restricted to report PMI and RI within a precoder codebook subset configured for each CSI process by higher layer signaling. This configuration may also be used to force a UE 14 to report a specific rank for a certain CSI process.

For CSI reporting, both periodic and aperiodic (i.e. triggered by eNB 12) reports are supported, known as Periodic Channel State Information (P-CSI) and Aperiodic Channel State Information (A-CSI) respectively. In the CSI process, a set of CSI-RS ports are configured for which the UE 14 performs measurements. These CSI-RS ports can be configured to be periodically transmitted with 5 ms, 10 ms, 20 ms etc. periodicity. The periodic report may use PUCCH format 2 or its variants (2a, 2b) and has a configured periodicity as well, e.g. 20 ms, and is a narrow bit pipe, containing at most 11 bits. Different aperiodic CSI report request configurations can be triggered in an aperiodic CSI request. The aperiodic CSI configurations can be for different cells or different CSI processes, but aperiodic CSI report requests for two different configurations for the same CSI process is not supported in Rel-13.

A CSI report corresponds to channel conditions in a particular subframe and set of PRBs termed the CSI reference resource, as defined in 3GPP TS 36.213 section 7.2.3. The CSI reference resource timing is defined relative to the subframe in which the CSI report is transmitted or requested, which allows an eNB 12 to determine how old the CSI report is and also determines how much time a UE 14 has to calculate the CSI report.

Figure 7B:
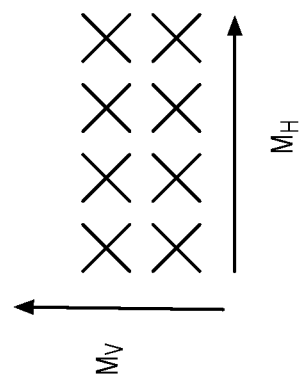
FIGS. 7A and 7B illustrate a two-dimensional antenna array of cross-polarized antenna elements, according to some embodiments of the present disclosure.
Figure 7A:
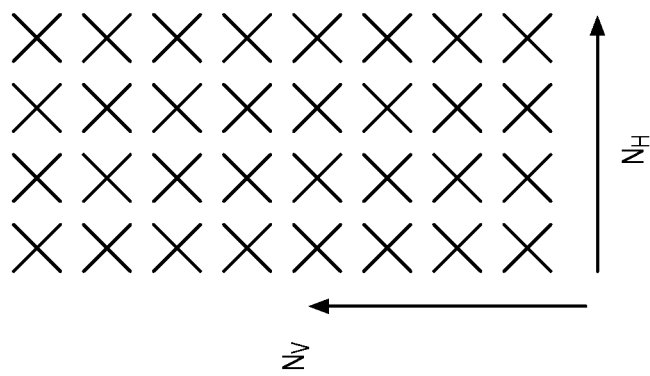

Recent developments in 3GPP have led to the discussion of two-dimensional antenna arrays where each antenna element has an independent phase and amplitude control, thereby enabling beamforming in both in the vertical and the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. An example of an antenna where $N_h=8$ and $N_v=4$ is illustrated in FIG. 7A. It furthermore consists of cross-polarized antenna elements meaning that $N_p=2$. This will be denoted as an 8×4 antenna array with cross-polarized antenna elements.

However, from a standardization perspective, the actual number of elements in the antenna array is not visible to the UE 14, but rather the antenna ports, where each port corresponds to a CSI reference signal. The UE 14 can thus measure the channel from each of these ports. Therefore, a 2D port layout is introduced described by the number of antenna ports in the horizontal dimension $M_h$, the number of antenna rows corresponding to the vertical dimension $M_v$ and the number of dimensions corresponding to different polarizations $M_p$ as is shown in FIG. 7B. The total number of antenna ports is thus $M=M_h M_v M_p$. The mapping of these ports onto the N antenna elements is an eNB implementation issue and thus not visible by the UE 14. The UE 14 does not even know the value of N; it only knows the value of the number of ports M.

Precoding may be interpreted as multiplying the signal with different beamforming weights for each antenna port prior to transmission. A typical approach is to tailor the precoder to the antenna form factor, i.e. taking into account $M_h$, $M_v$ and $M_p$ when designing the precoder codebook.

A common approach when designing precoder codebooks tailored for 2D antenna arrays is to combine precoders tailored for a horizontal array and a vertical array of antenna ports respectively by means of a Kronecker product. This means that (at least part of) the precoder can be described as a function of:

$$W_H \otimes W_V$$

where $W_H$ is a horizontal precoder taken from a (sub)-codebook $X_H$ containing $N_H$ codewords and similarly $W_V$ is a vertical precoder taken from a (sub)-codebook $X_V$ containing $N_V$ codewords. The joint codebook, denoted by $X_H \otimes X_V$, thus contains $N_H \cdot N_V$ codewords. The codewords of $X_H$ are indexed with $k=0, \ldots, N_H-1$, the codewords of $X_V$ are indexed with $l=0, \ldots, N_V-1$ and the codewords of the joint codebook $X_H \otimes X_V$ are indexed with $m=N_V \cdot k+l$ meaning that $m=0, \ldots, N_H \cdot N_V-1$.

For Rel-12 UE and earlier, only a codebook feedback for a 1D port layout is supported, with 2, 4, or 8 antenna ports. Hence, the codebook is designed assuming these ports are arranged on a straight line.

A large number of CSI-RS ports are needed if CSI-RS is transmitted on each antenna element of a large antenna array. This can have disadvantages, such as reduced CSI-RS range, higher UE complexity to compute CSI feedback, and higher CSI-RS overhead. Consequently, in Rel-13, support for beamformed CSI-RS was introduced, wherein CSI-RS are generally transmitted with narrower antenna patterns than full cell coverage. This can be contrasted with the non-precoded CSI-RS operation used in prior LTE releases, wherein CSI-RS generally was transmitted with antenna patterns with full cell coverage. Beamformed CSI-RS can be used to increase array gain for CSI-RS transmissions (improving coverage), reduce the number of ports needed in CSI feedback, as well as to reduce the CSI-RS overhead.

Non-precoded and beamformed CSI-RS operation is supported through CSI processes and/or CSI-RS resources configured as 'Class A', or 'Class B', respectively. Dynamic beamforming is supported by channel measurement restriction which restricts the UE to measure CSI-RS in one subframe only, so that the UE won't average CSI when the beamforming on the CSI is changing across subframes. Channel measurement restriction is only supported for Class B operation in LTE Rel-13.

A UE 14 configured for Class B operation can be configured with up to 8 CSI-RS resources, with up to 8 ports in each CSI resource, in one CSI process in LTE Rel-13. Such a UE 14 can be configured to report a CSI-RS resource indicator (CRI) to indicate which of the CSI-RS resources it will best be served upon. The UE 14 then provides CQI, RI, and/or PMI only for the best CSI-RS resource.

A UE 14 configured for Class B operation with one CSI-RS resource may use a port selection and cophasing codebook wherein the UE selects a subset of the CSI-RS ports and cophasing coefficients that combine the selected ports. This is identified in the layer 1 LTE specs with 'altenativeCodebookEnabledCLASSB_K1', and has been referred to as a 'W2-only' codebook in LTE contributions in 3GPP RAN1.

When a large number of CSI-RS ports are used for Class A or Class B operation, the overhead may be significant. One approach that was proposed to reduce this overhead was to transmit many Class A CSI-RS ports infrequently, and a few Class B CSI-RS ports frequently. The UE 14 feedback from Class A is used to select the beams applied to the Class B CSI-RS. This use of both Class A and Class B CSI-RS is called 'Hybrid' CSI reporting. By using Class A to measure the channel to each element of the array, the beamforming weights used for Class B can be determined accurately and with low eNB 12 complexity. The use of Class B with a small number of ports allows reduced CSI feedback overhead and limits UE 14 CSI computational complexity.

It is possible to support Hybrid CSI reporting using two CSI processes in LTE Rel-13, where a first process is configured with Class A and a second is configured with Class B. However, two CSI processing capability is more complex for the UE than single CSI process reporting, since the UE must be able to calculate CSI for two reports, rather than one.

Hybrid CSI-RS reporting designs do not consider infrequent Class B transmission with many ports, or frequent Class A transmission with a few ports. These CSI reporting configurations can be used to provide better CSI-RS coverage or richer CSI feedback.

Hybrid CSI-RS reporting requires a UE 14 to transmit Class A and Class B reports, and doing so within one CSI process would mean that new reporting mechanisms are needed.

UEs 14 configured with two CSI processes often need to compute twice as much CSI. This is especially the case for aperiodic reporting where an eNB can request a CSI report for either or both CSI processes in a given subframe, and the CSI reports do not have a fixed periodicity that can be used to separate the CSI reports to reduce the CSI computational complexity.

Figure 8:
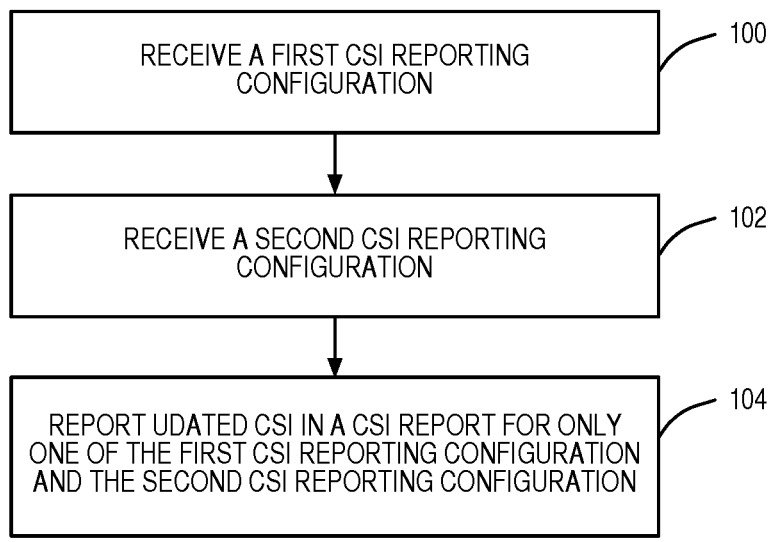
FIGS. 8-10 illustrate methods of operation of a wireless device, according to some embodiments of the present disclosure.

Therefore, systems and methods for low complexity multi-configuration CSI reporting are provided. As illustrated in FIG. 8, in some embodiments, a method of operating a wireless device 14 in a cellular communications network 10 to provide CSI feedback from multiple CSI reporting configurations is provided. The method includes receiving a first CSI reporting configuration (step 100) and receiving a second CSI reporting configuration (step 102). The method also includes reporting updated CSI in a CSI report for only one of the first CSI reporting configuration and the second CSI reporting configuration (step 104). In some embodiments, these CSI reporting configurations are known as enhanced MIMO (eMIMO)-Types. Also, in some embodiments, such as hybrid CSI aperiodic reporting, the UE 14 still reports, but is not expected to update, CSI for the other CSI reporting configuration. Therefore, in some embodiments, the UE 14 also determines which CSI reporting configuration to update. In this way, rich CSI feedback with many ports, different codebooks, mixed beamformed and non-precoded CSI-RS configurations, etc., can be supported while requiring less computational complexity in the wireless device.

The term "radio node" used herein may be used to denote a UE 14 or a radio network node 12.

In some embodiments a more general term "network node" is used and it can correspond to any type of radio network node or any network node, which communicates with a UE 14 and/or with another network node. Examples of network nodes are NodeB, Master eNB (MeNB), Secondary eNB (SeNB), a network node belonging to a Master Cell Group (MCG) or Secondary Cell Group (SCG), base station, Multi-Standard Radio (MSR) radio node such as MSR BS, eNodeB, network controller, Radio Network Controller (RNC), Base Station Controller (BSC), relay, donor node controlling relay, Base Transceiver Station (BTS), Access Point (AP), transmission points, transmission nodes, Radio Resource Unit (RRU), Radio Resource Head (RRH), nodes in a Distributed Antenna System (DAS), core network node (e.g. Mobile Switching Center (MSC), Mobile Management Entity (MME) etc.), Operation & Management (O&M), Operations Support System (OSS), Self-Organizing Network (SON), positioning node (e.g. Evolved Serving Mobile Location Center (E-SMLC)), Minimization of Drive Tests (MDT) etc.

In some embodiments the non-limiting terms UE 14 or a wireless device 14 are used interchangeably. The UE 14 herein can be any type of wireless device capable of communicating with a network node or another UE over radio signals. The UE 14 may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, Laptop Embedded Equipped (LEE), Laptop Mounted Equipment (LME), Universal Serial Bus (USB) dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

The CSI-RS resources in a primary CSI process can have a relatively large number of CSI-RS ports and their CSI-RS can be transmitted relatively infrequently with a configured periodicity. The CSI-RS resources in a subordinate CSI process then have a relatively small number of CSI-RS ports and their CSI-RS are transmitted relatively frequently. A UE 14 can report CSI feedback using either the primary or subordinate CSI process configuration. The eNB 12 uses the primary CSI feedback to determine beamforming weights to apply to the CSI-RS ports of the subordinate CSI process, and may also use the primary CSI feedback to determine the precoding to use for a PDSCH for the UE 14. The subordinate CSI feedback is used to determine the precoding to use for a PDSCH for the UE 14.

Figure 9:
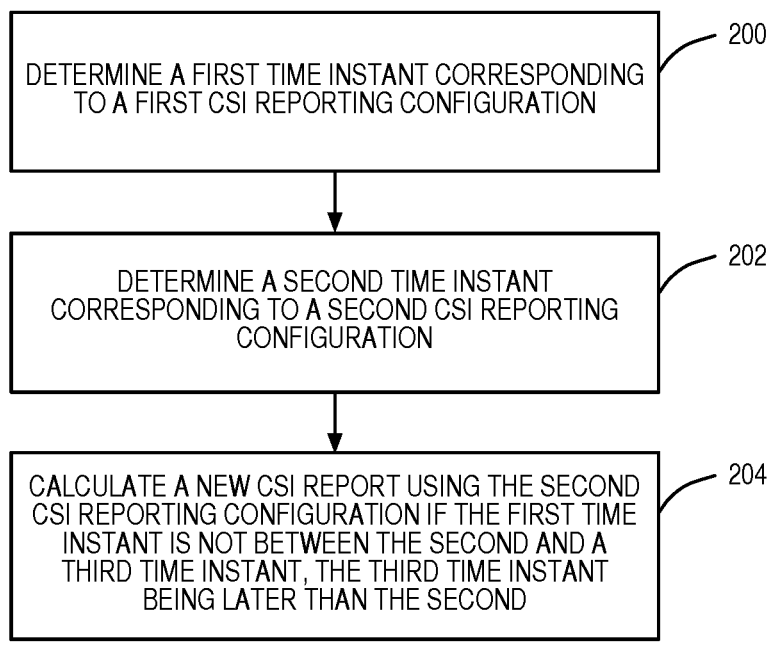
Figure 10:
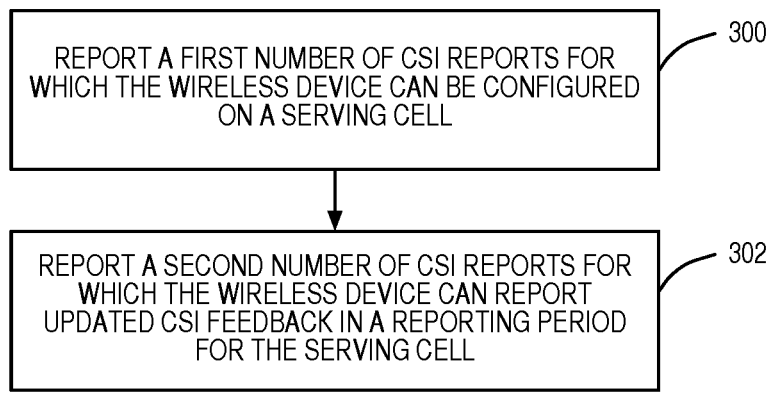

FIGS. 9 and 10 also illustrate methods of operation of a wireless device such as UE 14, according to some embodiments of the present disclosure. Specifically, FIG. 9 illustrates the UE 14 determining a first time instant corresponding to a first CSI reporting configuration (step 200). The UE 14 also determines a second time instant corresponding to a second CSI reporting configuration (step 202). More details regarding these time instants are provided below. Then, when the UE 14 is to calculate a new CSI report, the UE 14 calculates the new CSI report using the second CSI reporting configuration if the first time instant is not between the second and a third time instant, the third time instant being later than the second (step 204). In some embodiments, this allows the UE 14 to have a first or primary configuration that is usually updated. However, when it is time to update the second or subordinate configuration, the UE 14 may refrain from updating the first configuration. In some embodiments, the first time instant corresponds to a subframe containing the CSI-RS for the first CSI-RS resource; the second time instant corresponds to a subframe in which a report for the second CSI-RS resource is triggered; and the third time instant is $n_{cqi\_ref}-1$ subframes after the second time instant. In this way, rich CSI feedback with many ports, different codebooks, mixed beamformed and non-precoded CSI-RS configurations, etc., can be supported while requiring less computational complexity in the UE 14. Additional details and examples are discussed below.

FIG. 10 illustrates a case where the UE 14 may be able to be configured for a certain number of CSI reports for a specific serving cell, but the UE 14 may only be able to update a smaller number of the CSI reports during a given time. First, the UE 14 reports a first number of CSI reports for which the UE 14 can be configured on a serving cell (step 300). Then, the UE 14 reports a second number of CSI reports for which the UE 14 can report updated CSI feedback in a reporting period for the serving cell (step 302). Additional details and examples are discussed below.

Figure 11:
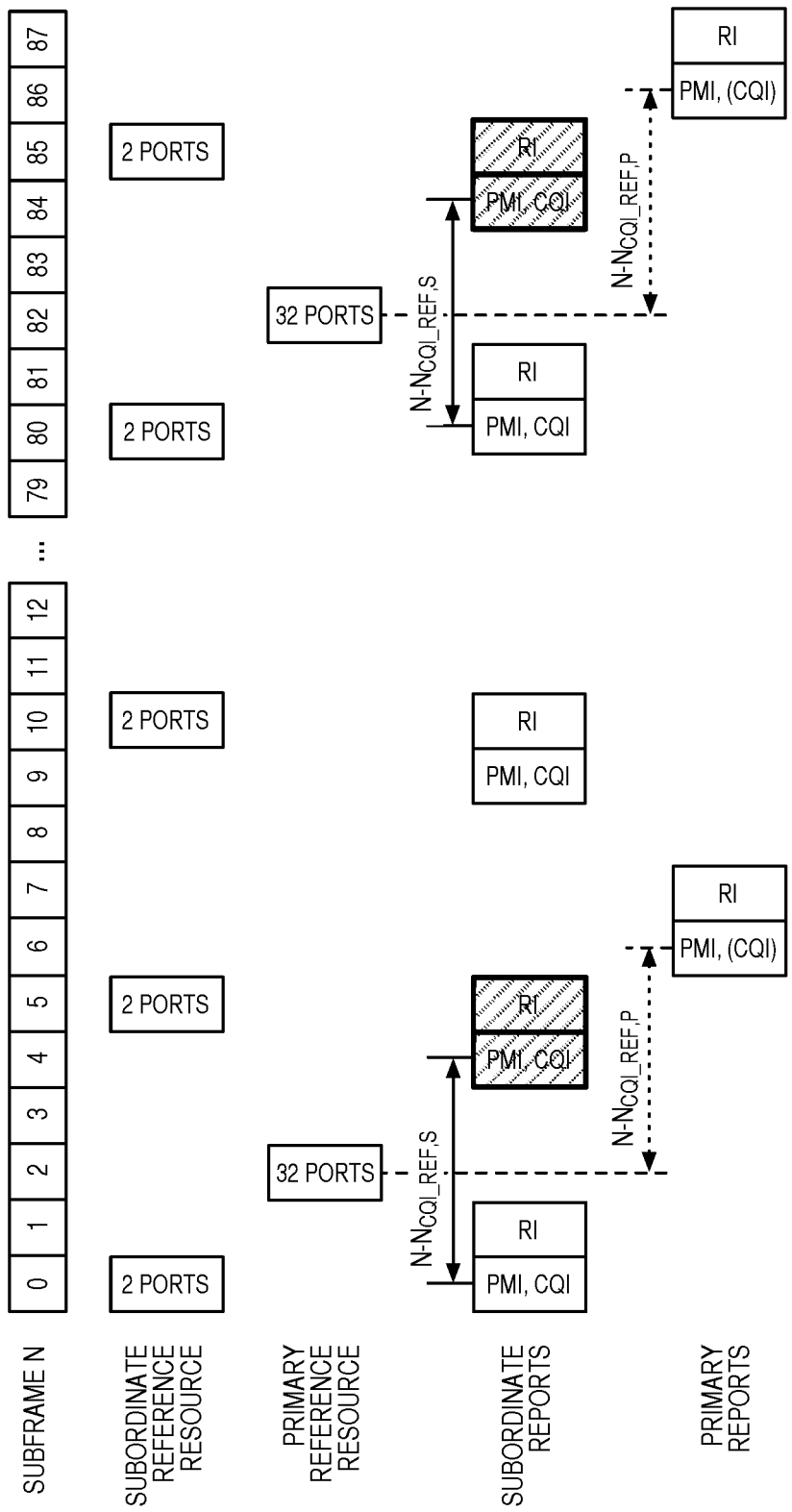
FIGS. 11-13 illustrate several CSI reporting instances, according to some embodiments of the present disclosure.

FIG. 11 illustrates an example of CSI reporting timing for this embodiment, and how CSI reporting and calculation can be performed for only one of the primary or subordinate CSI processes at a time. In this example, 32 port CSI-RS transmission for the primary CSI process occurs once every 80 subframes, whereas a two port CSI-RS resource is transmitted once every 5 subframes for the subordinate CSI process. Note that the reference resource is shown, and the actual CSI-RS transmission may be in the same or a different subframe than the reference resource. Periodic CSI reporting using RI, PMI, and CQI is shown for the sake of example. The 32 port codebook based reporting is assumed to have the same structure as LTE Rel-13 16 port reporting, wherein PUCCH transmissions in a subframe contain either RI, $i_{11}$ and $i_{12}$, or $i_2$ and CQI, and $i_2$ and CQI is time multiplexed with $i_{11}$ and $i_{12}$ in subframes labeled with 'PMI, (CQI)'. The two port reporting transmissions in a subframe contain either RI or PMI and CQI.

In the illustrated embodiment, the UE reports only the primary CSI if the reference resource for the primary CSI process occurs in the subframes between the subordinate CSI report and the reference resource for the subordinate CSI report, and the subordinate CSI need not be calculated. This is shown where the first subframe of a potential subordinate CSI port beginning in subframe 4 has a reference resource in subframe $n-n_{cqi\_ref,s}$. The first subframe of the primary CSI report beginning in subframe 6 has a reference resource in subframe $n-n_{cqi\_ref,p}$. In this example, $n_{cqi\_ref,s}$ and $n_{cqi\_ref,p}$ are both 4 subframes, and so the reference resource for the potential subordinate CSI report is in subframe 0. The primary CSI reference resource is in subframe 2, which is in the interval between subframes 0 and 4, and therefore in the subframes between the potential subordinate CSI report and the reference resource for the potential subordinate CSI report. Therefore, the subordinate CSI will not be reported in subframes 4 and 5, as indicated by the diagonal lines through the RI and PMI CQI subordinate reports in the figure, while the primary CSI is reported in subframes 6-8.

It is also desirable to allow the UE to calculate only one aperiodic CSI report for either the primary or subordinate CSI processes at a time. In an example embodiment, the UE 14 is only required to update CSI for a limited number of CSI processes, where the number of CSI processes to be reported is determined at the time the UE is triggered for reporting as $\max(N_x-N_s-0)$, $N_x$ is a maximum number of CSI processes that can be reported by the UE 14, $N_u$ is a number of unreported CSI processes other than those being triggered, $N_s$ is a number of subordinate CSI processes, and a CSI process associated with a CSI request is counted as unreported in a subframe before the subframe where a Physical Uplink Shared Channel (PUSCH) carrying the corresponding CSI is transmitted. For example, assume a UE can support at most one primary and one subordinate CSI processes, and so $N_x=2$. Then in FIG. 11, assuming that the delay between a CSI trigger and an aperiodic CSI report is 4 subframes, if a subordinate aperiodic CSI report is triggered in subframe 0, the UE will report CSI in subframe 4. In that case, if a primary aperiodic CSI report is also triggered in subframe 2, the UE will report CSI in subframe 6, and therefore $N_u=1$ in subframes 0-3. The UE will then update $\max(N_x-N_s-N_u, 0)=\max(2-1-1,0)=0$ if it is triggered for aperiodic CSI in subframes 0-3. This means that the CSI reported in subframe 6 from the primary CSI process would not be updated. Since it is likely that the CSI from the primary CSI process is more important than the subordinate CSI process, the eNB should not trigger the subordinate CSI report in subframe 0, thereby allowing the primary CSI to be updated with the trigger in subframe 2. The eNB can select which of the primary or subordinate CSI processes to trigger by indicating the index of the CSI process in downlink signaling.

In a similar embodiment, the number of CSI processes to be reported in aperiodic reporting is determined at the time the UE is triggered for reporting as $\max(N_p-N_u,0)$, where $N_p$ is a number of CSI processes for which the UE can provide updated CSI on a serving cell in a reporting period, $N_p$ may be less than the total number of CSI processes the UE may be configured for on the serving cell, $N_u$ is a number of unreported CSI processes other than those being triggered, and a CSI process associated with a CSI request is counted as unreported in a subframe before the subframe where the PUSCH carrying the corresponding CSI is transmitted.

In some embodiments, a CSI process can be identified as a subordinate CSI process in signaling by configuring it with the identity of a primary CSI process. In other embodiments, a subordinate CSI process is identified by configuring it as a subordinate CSI process. Similarly, a primary CSI process may be identified by configuring a CSI process with the identity of a subordinate CSI process, or by configuring the CSI process as a primary CSI process. In other embodiments, a CSI process is configured with a priority value in addition to its CSI process identifier, in which case CSI processes are not necessarily identified as primary or subordinate, and the priority values of two CSI processes are compared to determine which process should have its CSI updated.

In some embodiments, UE capability signaling indicates that the UE supports multiple CSI processes on a serving cell but only where the UE is required to calculate fewer CSI reports than the number of CSI processes on the serving cell. The UE may report that it can be configured for $N_x$ CSI processes for a serving cell, but only if $N_s$ of the $N_x$ CSI processes for the serving cell are subordinate CSI processes. Therefore, the UE indicates that it can be required to compute at most $N_x-N_s$ periodic or aperiodic CSI reports in a reporting period for the serving cell. This capability can also be expressed as that the UE can be configured for $N_x$ CSI processes, but only if $N_p$ of the $N_x$ CSI processes are primary CSI processes, and so the UE can report no more than $N_p$ periodic or aperiodic CSI reports in a reporting period for a serving cell. A number of primary CSI processes may alternately be identified as a maximum number of CSI processes for which a UE can provide updated CSI in a reporting period.

In some embodiments, the CSI-RS ports associated with the primary and subordinate CSI processes can always be assumed to be quasi-collocated with one set of CRS ports. This simplifies reference signal tracking and estimation in the UE. In this case, a UE is not expected to receive CSI-RS resource configurations for a subordinated and its primary CSI process that have different values of a higher layer parameter providing quasi-collocation information such as qcl-CRS-Info-r11 in 3GPP TSs 36.213 and 36.331.

In some embodiments, the primary CSI process is an RI reference process for the subordinate CSI process. In this case, a UE uses the rank it reports for the primary CSI process as the rank for CSI calculations in the subordinate CSI process. This allows CSI reporting consistency between a subordinate Class B CSI process using beamformed CSI-RS determined from the measurements of a primary Class A measurements.

Figure 12:
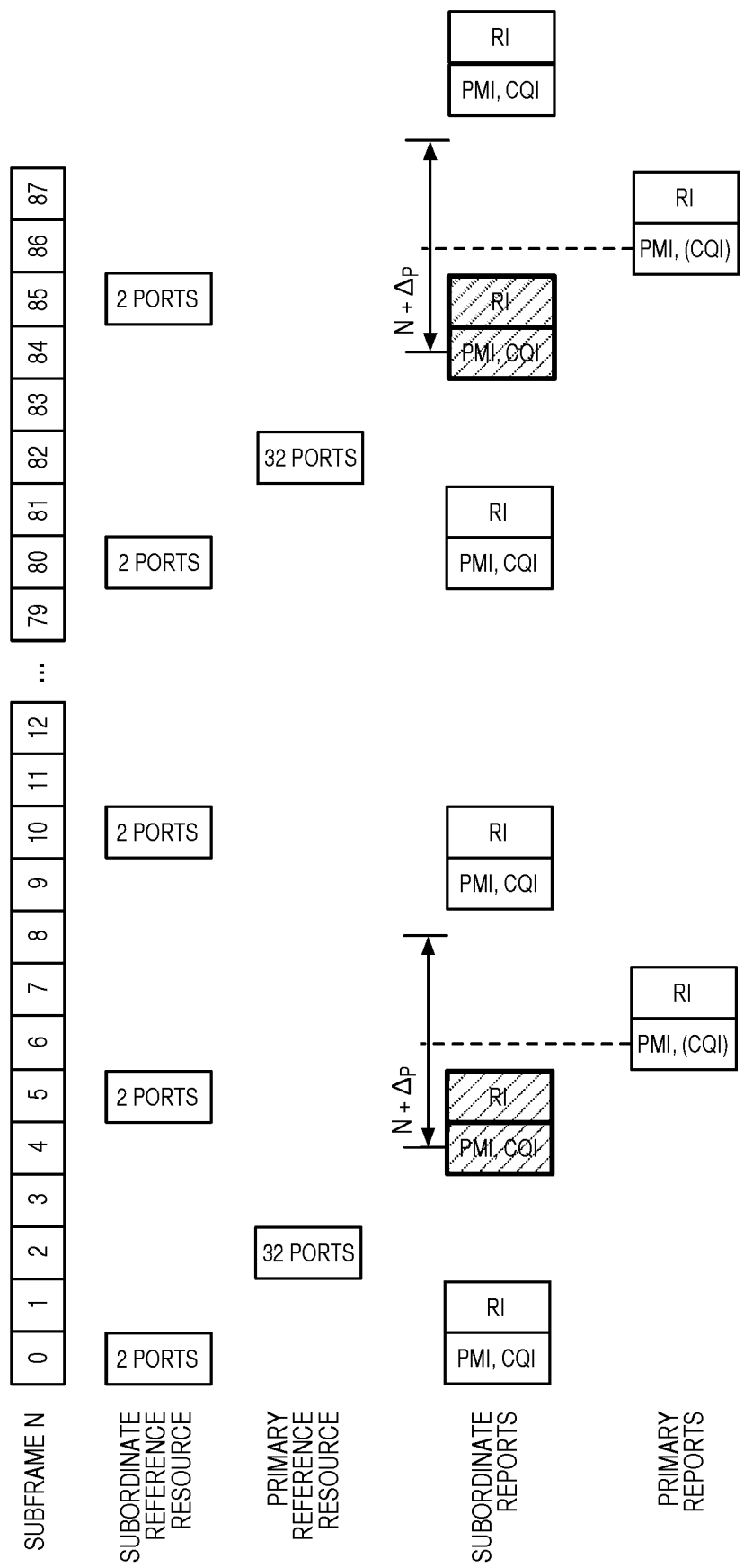

When periodic reporting is used, the reporting time instants are known, and it is possible to determine if a later CSI report would be close in time to a CSI report in subframe n. In this case, an alternative embodiment can be used, where a periodic subordinate CSI report is only transmitted if it is not too close to a later periodic primary CSI report. More precisely, a subordinate CSI report is not transmitted in subframe n if a primary CSI report occurs in the subframes n to n+$\Delta_p$, where $\Delta_p$ is a predetermined value known to both the eNB and the UE 14. This is illustrated in FIG. 12. Here, $\Delta_p$=4 subframes is assumed. The subordinate CSI report is not transmitted in subframe 4 because a primary CSI report occurs in subframe 6, which is between subframes n=4 and n+$\Delta_p$=8. Because the UE 14 knows prior to receiving the reference CSI resource for the subordinate CSI that the subordinate CSI report will not be transmitted, the UE 14 need not compute the subordinate CSI report.

In these embodiments, a UE 14 can be configured with one CSI process, but has multiple CSI-RS resources associated with a CSI process. Each CSI-RS resource may be associated with other parameters such as codebook configurations, quasi-collocation information, etc. Similar to other embodiments, primary and subordinate CSI-RS resources can be defined, and the subordinate CSI-RS resources are transmitted more frequently than the primary CSI-RS resources. Also, primary CSI feedback can be used to determine beamforming weights for the subordinate CSI-RS and both subordinate and primary CSI-RS resources can be used to determine precoding for a UE's PDSCH.

Figure 13:
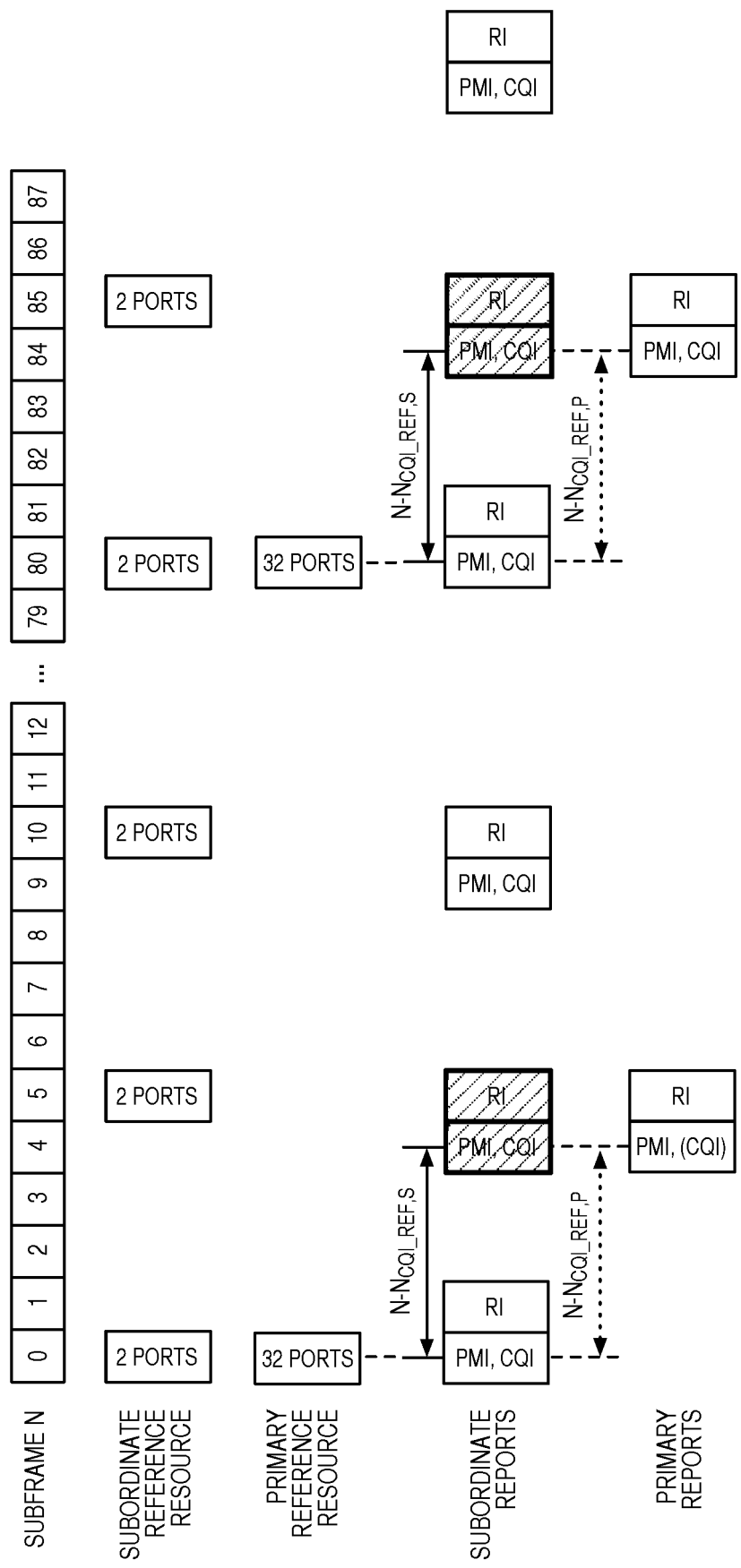

FIG. 13 illustrates the CSI reporting timing for an embodiment, and how CSI reporting and calculation can be performed on only one of the primary or subordinate CSI-RS reference resources at a time. The CSI reporting configuration is similar to that shown for other embodiments, where 32 port CSI-RS is transmitted once every 80 subframes, and a 2 port CSI-RS resource is transmitted once every 5 subframes for the subordinate CSI process. Note again that the reference resource is shown, and the actual CSI-RS transmission may be in the same or a different subframe than the reference resource. RI, PMI, and CQI are reported. Since one CSI process is used, a new mechanism is needed to multiplex the CSI reports for the primary and subordinate CSI into the single PUCCH reporting configuration for the CSI process. Therefore, the UE reports only the CSI associated with the primary CSI-RS resources if the reference resource for the primary CSI resources occurs in the subframes between the subordinate CSI report and the reference resource for the subordinate CSI report. This is illustrated in FIG. 13 where the primary report replaces the subordinate report in subframes 4, 5 and 84, 85.

In some embodiments, one CQI reporting periodicity parameter is used to determine when both the primary and subordinate CSI reports are transmitted. This is illustrated in FIG. 13 where a subordinate CSI report can potentially occur at multiples of 5 subframes, but is replaced by a primary CSI report as discussed above. This use of a single periodicity parameter simplifies CSI reporting in the UE, and allows reuse of Rel-13 PUCCH reporting mechanisms.

In another embodiment, periodic CSI reporting is configured only for the primary CSI-RS resource, thus only the CSI corresponding to the primary CSI-RS resource is reported periodically. Alternatively, periodic CSI reporting may be configured only for a subordinate CSI-RS resource, thus only the CSI corresponding to the subordinate CSI-RS resource is reported periodically.

It is also desirable to allow the UE 14 to calculate only one aperiodic CSI report of either the subordinate or primary CSI resources at a time in some embodiments. In this case, a CSI request field in downlink control signaling can identify a CSI resource as well as a CSI process. In this way, the UE 14 need not support additional CSI processes, and the eNB 12 can select a primary or subordinate CSI resource it would like reported. An example of how CSI request field can identify CSI resources is shown below. The underlined text is that added to the text in 3GPP TS 36.213 v13.0.1.

TABLE 7.2.1-1C

| CSI Request field for PDCCH/EPDCCH with uplink DCI format in UE specific search space | |
|---|---|
| Value of CSI request field | Description |
| '00' | No aperiodic CSI report is triggered |
| '01' | Aperiodic CSI report is triggered for a set of {CSI resources, CSI process}-pair(s) and/or {CSI process, CSI subframe set}-pair(s) configured by higher layers for serving cell c |
| '10' | Aperiodic CSI report is triggered for a $1^{st}$ set of {CSI resources, CSI process} -pair(s) and/or {CSI process, CSI subframe set}-pair(s) configured by higher layers |
| '11' | Aperiodic CSI report is triggered for a $2^{nd}$ set of {CSI resources, CSI process} -pair(s) and/or {CSI process, CSI subframe set}-pair(s) configured by higher layers |

In some embodiments, the CSI-RS ports associated with the primary and subordinate CSI-RS resources can always be assumed to be quasi-collocated with one set of CRS ports. This simplifies reference signal tracking and estimation in the UE. In this case, a UE is not expected to receive primary and subordinate CSI-RS resource configurations that have different values of a higher layer parameter providing quasi-collocation information such as qcl-CRS-Info-r11 in 3GPP TSs 36.213 and 36.331

In some embodiments, a CSI-RS resource is identified by an index and is associated with at least an NZP CSI-RS configuration, where an NZP CSI-RS configuration may comprise a number of antenna ports, a resource configuration, a subframe configuration, and/or a scrambling identity, where these parameters are as in TS 36.211 v13.0.0. section 6.10.5.2. The CSI-RS resource may comprise additional parameters, including a CSI-IM configuration, a CSI reporting type, a CSI reporting codebook configuration, and quasi-collocation information.

In some embodiments, a CSI-RS resource is identified as a subordinate CSI-RS resource in signaling by configuring it with the identity of a primary CSI-RS resource. In other embodiments, a subordinate CSI-RS resource is identified by configuring it as a subordinate CSI-RS resource. Similarly, a primary CSI-RS resource may be identified by configuring a CSI resource with the identity of a subordinate CSI-RS resource, or by configuring the CSI-RS resource as a primary CSI resource. In other embodiments, a CSI-RS resource is configured with a priority value, in which case CSI processes are not necessarily identified as primary or subordinate, and the priority values of two CSI-RS resources are compared to determine which should have its corresponding CSI updated. In still other embodiments, a CSI resource is identified as a subordinate CSI resource by configuring ZP CSI-RS occupying at least some of the resource elements in an OFDM symbol that are occupied by an NZP CSI-RS configuration associated with the CSI resource.

Figure 14:
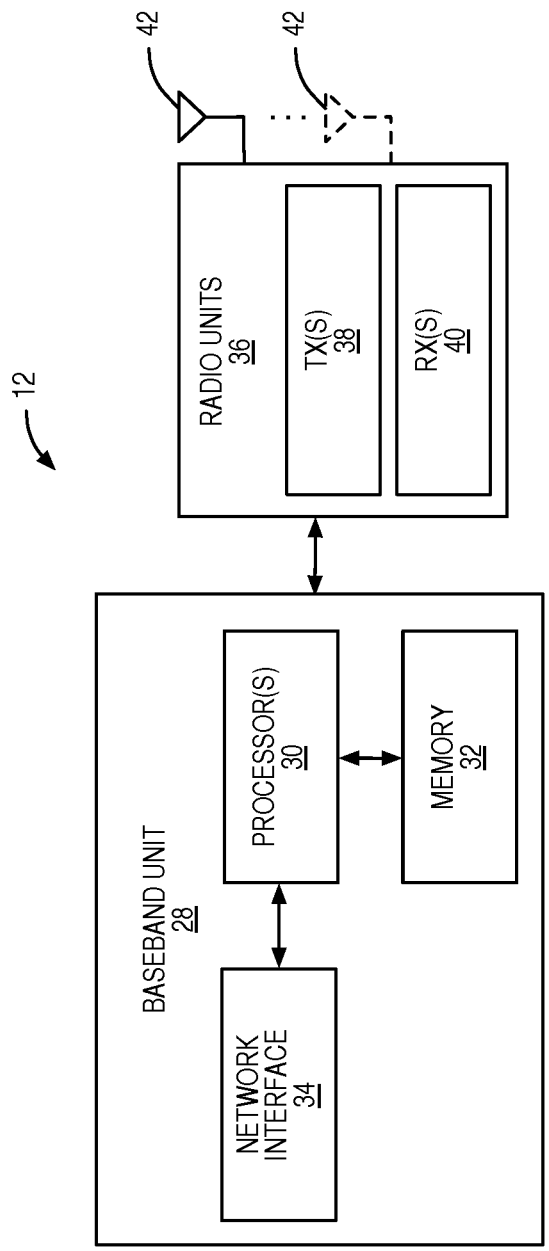
FIG. 14 is a diagram of a base station according to some embodiments of the present disclosure.

FIG. 14 is a diagram of a base station 12 according to some embodiments of the present disclosure. As used herein, this base station 12 may be a network node 12, an eNB 12, or any other network node capable of performing the processes discussed herein. In some embodiments, the base station 12 includes circuitry containing instructions, which when executed cause the base station 12 to implement the methods and functionality described herein. In one example, the circuitry can be in the form of processing means which may include a processor and a memory containing instructions. As illustrated, the base station 12 includes a baseband unit 28 that includes at least one processor 30 and memory 32. The baseband unit 28 also includes a network interface 34. As illustrated, the base station 12 also includes at least one radio unit 36 with one or more transmitters 38, one or more receivers 40, and one or more antennas 42. In some embodiments, the base station 12, or the functionality of the base station 12 described with respect to any one of the embodiments described herein, is implemented in software that is stored in, e.g., the memory 32 and executed by the processor 30. The network interface 34 may include one or more components (e.g., network interface card(s)) that connect the base station 12 to other systems.

In some embodiments, a computer program including instructions which, when executed by the at least one processor 30, causes the at least one processor 30 to carry out the functionality of the base station 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 15:
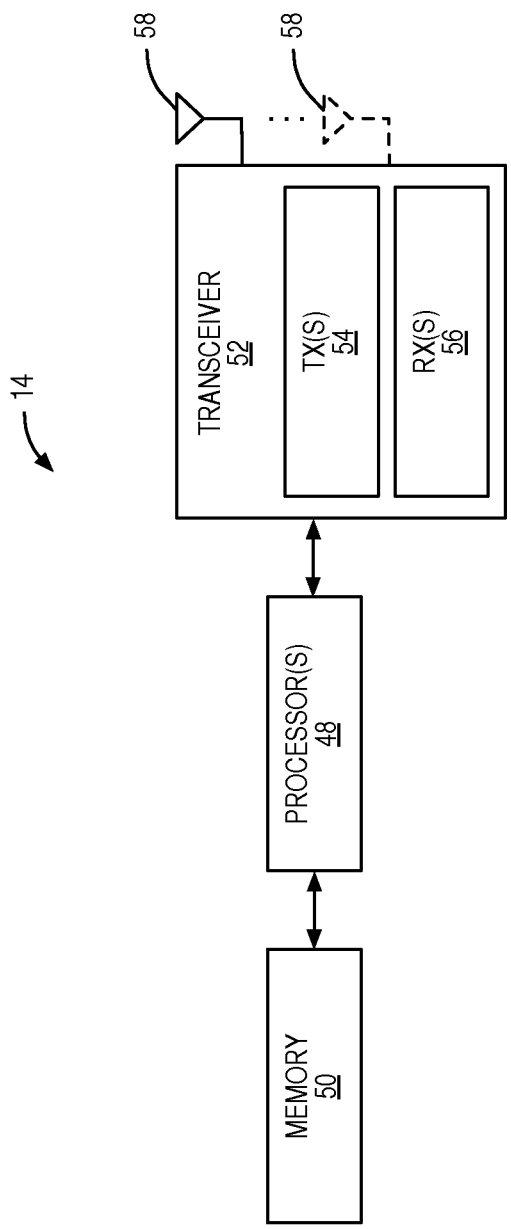
FIG. 15 is a diagram of a wireless device according to some embodiments of the present disclosure.

FIG. 15 is a diagram of a wireless device according to some embodiments of the present disclosure. As used herein, this wireless device 14 may be a UE 14 or any other device capable of performing the processes discussed herein. As illustrated, the wireless device 14 includes at least one processor 48 and memory 50. The wireless device 14 also includes a transceiver 52 with one or more transmitters 54, one or more receivers 56, and one or more antennas 58. In some embodiments, wireless device 14, or the functionality of the wireless device 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the wireless device 14 to other systems.

In some embodiments, a computer program including instructions which, when executed by at least one processor 48, causes the at least one processor 48 to carry out the functionality of the wireless device 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 16:
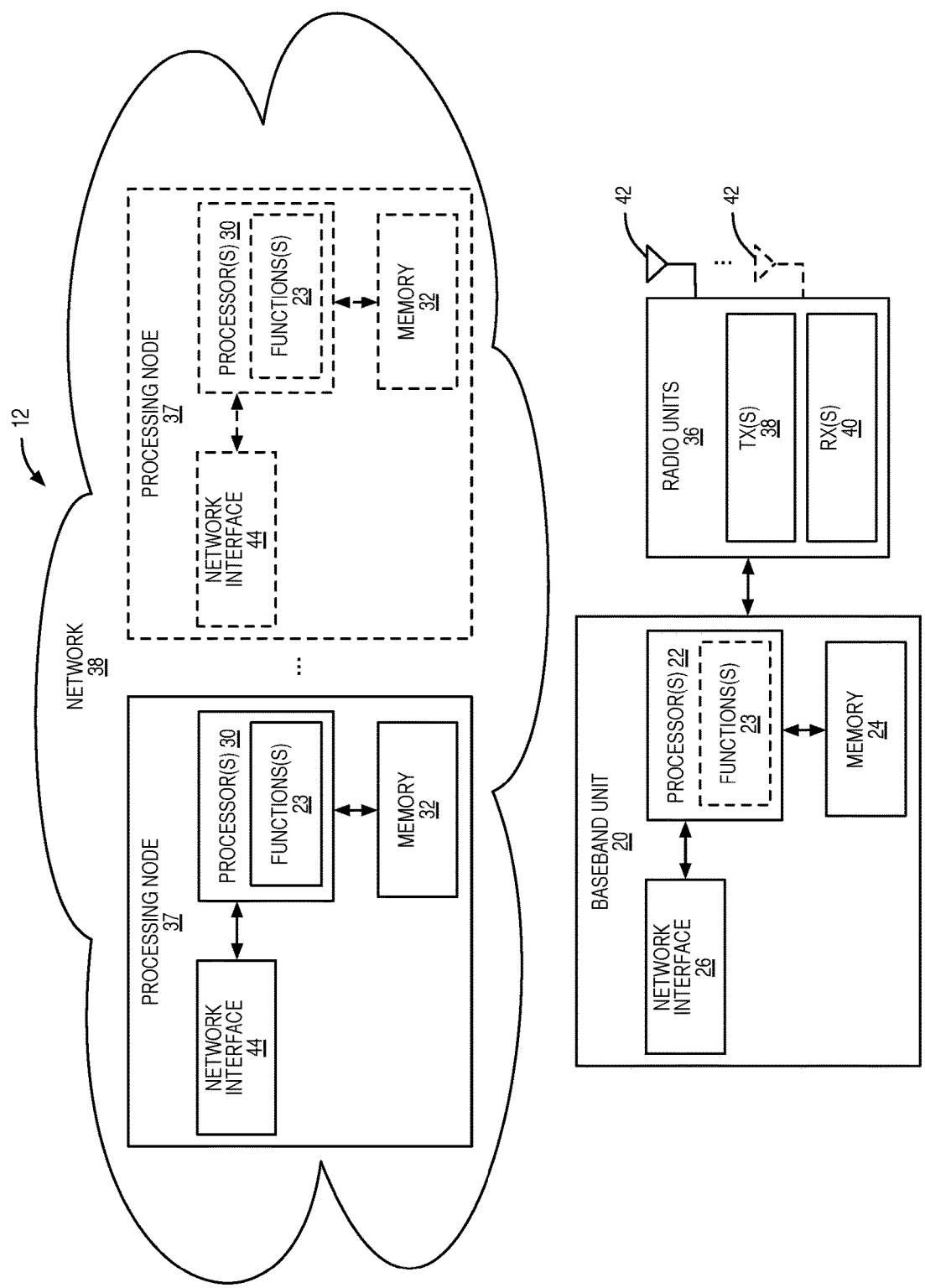
FIG. 16 is a schematic block diagram that illustrates a virtualized embodiment of a network node, according to some embodiments of the present disclosure.

FIG. 16 is a schematic block diagram that illustrates a virtualized embodiment of the base station 12 according to some embodiments of the present disclosure. This discussion is equally applicable to other types of radio access nodes. Further, other types of network nodes may have similar architectures (particularly with respect to including processor(s), memory, and a network interface).

As used herein, a "virtualized" radio access node is a radio access node in which at least a portion of the baseband functionality of the base station is implemented as a virtual component (e.g., via a virtual machine(s) executing on a physical processing node(s) in a network(s)). As illustrated, the base station 12 includes a baseband unit 20 that includes one or more processors 22 (e.g., Central Processing Units (CPUs), Application Specific Integrated Circuits (ASICs), Field Programmable Gate Arrays (FPGAs), and/or the like), memory 24, and network interface 26 as well as the one or more radio units 36 each of which includes one or more transmitters 38 and one or more receivers 40 coupled to one or more antennas 42, as described above. The baseband unit 20 is connected to radio unit(s) 28 via, for example, an optical cable or the like. The baseband unit 20 is connected to one or more processing nodes 37 coupled to or included as part of a network(s) 38 via the network interface 26. Each processing node 37 includes one or more processors 30 (e.g., CPUs, ASICs, FPGAs, and/or the like), memory 32, and a network interface 44.

In this example, the functions 23 of the base station 12 described herein are implemented at the one or more processing nodes 37 or distributed across the baseband unit 20 and the one or more processing nodes 37 in any desired manner. In some particular embodiments, some or all of the functions 23 of the base station 12 described herein are implemented as virtual components executed by one or more virtual machines implemented in a virtual environment(s) hosted by the processing node(s) 36. As will be appreciated by one of ordinary skill in the art, additional signaling or communication between the processing node(s) 36 and the baseband unit 20 is used in order to carry out at least some of the desired functions such as, for example, transmitting the grant and/or transmitting the indication of the carrier mode of at least one carrier. Notably, in some embodiments, the baseband unit 20 may not be included, in which case the radio unit 36 communicates directly with the processing node 37 via an appropriate network interface.

In some embodiments, a computer program including instructions which, when executed by at least one processor, causes the at least one processor to carry out the functionality of a radio access node (e.g., a base station 12) or a node (e.g., a processing node 37) implementing one or more of the functions 23 of the radio access node in a virtual environment according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 17:
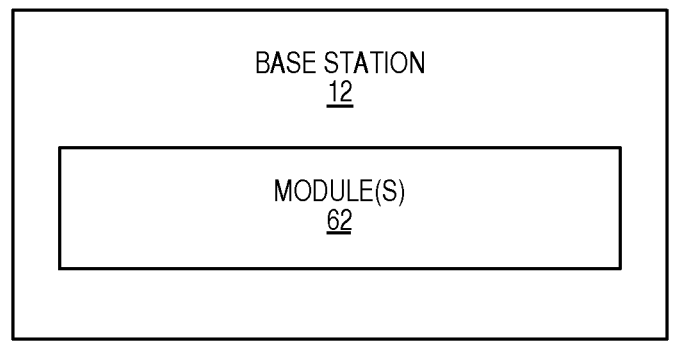
FIG. 17 is a block diagram of a base station including modules, according to some embodiments of the present disclosure.

FIG. 17 is a block diagram of a base station 12 according to some other embodiments of the present disclosure. As illustrated, the base station 12 includes one or more modules 62, each of which is implemented in software. The module(s) 62 operate to provide the functionality of the base station 12 according to any of the embodiments described herein. In some embodiments, the modules(s) 62 are operative to configure a wireless device 14 with a first CSI reporting configuration; configure the wireless device 14 with a second CSI reporting configuration; and receive an updated CSI report from the wireless device 14 for only one of the first CSI reporting configuration and the second CSI reporting configuration.

Figure 18:
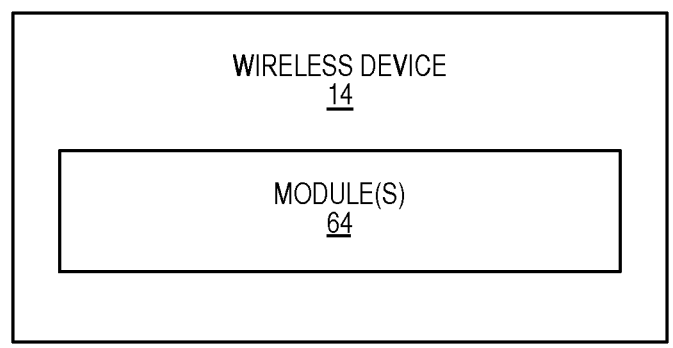
FIG. 18 is a block diagram of a wireless device including modules, according to some embodiments of the present disclosure.

FIG. 18 is a block diagram of a wireless device 14 (e.g., UE 14) according to some other embodiments of the present disclosure. As illustrated, the wireless device 14 includes one or more modules 64, each of which is implemented in software. The module(s) 64 operate to provide the functionality of the wireless device 14 according to any of the embodiments described herein. In some embodiments, the modules(s) 64 are operative to receive a first CSI reporting configuration; receive a second CSI reporting configuration; and report an updated CSI report for only one of the first CSI reporting configuration and the second CSI reporting configuration.

While processes in the figures and description may show a particular order of operations performed by certain embodiments, it should be understood that such order is exemplary (e.g., alternative embodiments may perform the operations in a different order, combine certain operations, overlap certain operations, etc.).

While the present disclosure has been described in terms of several embodiments, those skilled in the art will recognize that the present disclosure is not limited to the embodiments described, can be practiced with modification and alteration within the spirit and scope of the appended claims. The description is thus to be regarded as illustrative instead of limiting.

The following acronyms are used throughout this disclosure.

3GPP Third Generation Partnership Project
5G Fifth Generation
ACK Acknowledgement
A-CSI Aperiodic Channel State Information
AP Access Point
ASIC Application Specific Integrated Circuit
BSC Base Station Controller
BTS Base Transceiver Station
CPE Customer Premises Equipment
CPU Central Processing Unit
CQI Channel Quality Indication
CRI CSI-RS Resource Indicator
CRS Cell Specific Reference Signal
CSI Channel State Information
CSI-RS Channel State Information Reference Signal
D2D Device to Device
DAS Distributed Antenna System
DFT Discrete Fourier Transform
eMIMO enhanced Multiple Input Multiple Output
eNB Enhanced or Evolved Node B
E-SMLC Evolved Serving Mobile Location Center
FPGA Field Programmable Gate Array
HARQ Hybrid Automatic Repeat Request
IoT Internet of Things
LEE Laptop Embedded Equipment
LME Laptop Mounted Equipment
LTE Long Term Evolution
M2M Machine to Machine
MCG Master Cell Group
MDT Minimization of Drive Tests
MeNB Master Enhanced Node B
MIMO Multiple Input Multiple Output
MME Mobility Management Entity
MSC Mobile Switching Center
MSR Multi-Standard Radio
MTC Machine Type Communication
NACK Negative Acknowledgement
NB-IoT Narrowband Internet of Things
NZP Non-Zero Power
O&M Operation and Management
OFDM Orthogonal Frequency Division Multiplexing
OSS Operations Support System
P-CSI Periodic Channel State Information
PMI Precoding Matrix Indicator
PUCCH Physical Uplink Control Channel
QoS Quality of Service
RI Rank Indicator
RNC Radio Network Controller
RRH Radio Resource Head
RRU Radio Resource Unit
SCG Secondary Cell Group
SeNB Secondary Enhanced Node B
SON Self-Organizing Network
TFRE Time/Frequency Resource Element
UE User Equipment
USB Universal Serial Bus
VOIP Voice over Internet Protocol
VPN Virtual Private Network
ZP Zero Power Those skilled in the art will recognize improvements and modifications to the embodiments of the present disclosure. All such improvements and modifications are considered within the scope of the concepts disclosed herein.

What is claimed is:

1. A method of operating a wireless device in a cellular communications network, to provide Channel State Information, CSI, feedback from multiple CSI reporting configurations, the method comprising:
   receiving a first CSI reporting configuration;
   receiving a second CSI reporting configuration;
   reporting updated CSI in a CSI report for only one of the first CSI reporting configuration and the second CSI reporting configuration:
   determining a first time instant corresponding to the first CSI reporting configuration;
   determining a second time instant corresponding to the second CSI reporting configuration; and
   calculating the CSI report using the second CSI reporting configuration if the first time instant is not between the second time instant and a third time instant, where the third time instant is later than the second time instant.

2. The method of claim 1 wherein:
   determining the first time instant comprises determining the first time instant as one of the group comprising:
   a time instant that contains a first CSI reference resource; and
   a transmission time for a first CSI report.

3. The method of claim 1 wherein:
   determining the second time instant comprises determining the second time instant as one of the group comprising:
   a time instant that contains a second CSI reference resource; and
   a transmission time for a second CSI report.

4. The method of claim 1 wherein the third time instant is one of the group comprising:
   a time instant when the wireless device transmits the CSI report; and
   a predetermined length after the second time instant, the predetermined length of time being at least one subframe.

5. The method of claim 4 wherein the predetermined length of time is $(n_{cqi\_ref}-1)$ subframes such that the third time instant is $(n_{cqi\_ref}-1)$ subframes after the second time instant.

6. The method of claim 1 wherein:
   determining the first time instant comprises determining the first time instant as the time instant that contains the first CSI reference resource;
   determining the second time instant comprises determining the second time instant as the time instant that contains the second CSI reference resource; and
   the third time instant is the time instant when the wireless device transmits the CSI report.

7. The method of claim 1 wherein:
   determining the first time instant comprises determining the first time instant as the transmission time for the first CSI report;

determining the second time instant comprises determining the second time instant as the transmission time for the second CSI report; and the third time instant is the predetermined length after the second time instant, the predetermined length of time being at least one subframe.

8. The method of claim 1 wherein:
receiving the first CSI reporting configuration comprises receiving a first CSI resource for a CSI process of the wireless device; and
receiving the second CSI reporting configuration comprises receiving a second CSI resource for the CSI process of the wireless device.

9. The method of claim 8 further comprising:
receiving a CSI report request for either the first CSI reporting configuration or the second CSI reporting configuration; and
wherein reporting the CSI report for only one of the first CSI reporting configuration and the second CSI reporting configuration comprises reporting the CSI report for the one of the first CSI reporting configuration and the second CSI reporting configuration according to the CSI report request.

10. The method of claim 9 wherein receiving the CSI report request comprises:
receiving a value of "10" to indicate that the CSI report request is for the first CSI reporting configuration; and
receiving a value of "11" to indicate that the CSI report request is for the second CSI reporting configuration.

11. The method of claim 1 wherein a port associated with the first CSI reporting configuration and a port associated with the second CSI reporting configuration can always be assumed to be quasi-collocated.

12. The method of claim 1 wherein the wireless device does not expect to receive the first CSI reporting configuration and the second CSI reporting configuration that have different values of a higher layer parameter providing quasi-collocation information such as qcl-CRS-Info-r11.

13. A wireless device comprising:
at least one processor; and
memory comprising instructions executable by the at least one processor whereby the wireless device is operable to:
receive a first CSI reporting configuration;
receive a second CSI reporting configuration;
report an updated CSI report for only one of the first CSI reporting configuration and the second CSI reporting configuration;
determine a first time instant corresponding to the first CSI reporting configuration;
determine a second time instant corresponding to the second CSI reporting configuration; and
calculate the CSI report using the second CSI reporting configuration if the first time instant is not between the second time instant and a third time instant, where the third time instant is later than the second time instant.

14. The wireless device of claim 13 wherein:
determining the first time instant comprises being operable to determine the first time instant as one of the group comprising:
a time instant that contains a first CSI reference resource; and
a transmission time for a first CSI report.

15. The wireless device of claim 13 wherein:
determining the second time instant comprises being operable to determine the second time instant as one of the group comprising:
a time instant that contains a second CSI reference resource; and
a transmission time for a second CSI report.

16. The wireless device of claim 13 wherein the third time instant is one of the group comprising:
a time instant when the wireless device transmits the CSI report; and
a predetermined length after the second time instant, the predetermined length of time being at least one subframe.

17. The wireless device of claim 16 wherein the predetermined length of time is $(n_{cqi\_ref}-1)$ subframes such that the third time instant is $(n_{cqi\_ref}-1)$ subframes after the second time instant.

18. The wireless device of claim 13 wherein:
determining the first time instant comprises being operable to determine the first time instant as the time instant that contains the first CSI reference resource;
determining the second time instant comprises being operable to determine the second time instant as the time instant that contains the second CSI reference resource; and
the third time instant is the time instant when the wireless device transmits the CSI report.

19. The wireless device of claim 13 wherein:
determining the first time instant comprises being operable to determine the first time instant as the transmission time for the first CSI report;
determining the second time instant comprises being operable to determine the second time instant as the transmission time for the second CSI report; and
the third time instant is the predetermined length after the second time instant, the predetermined length of time being at least one subframe.

20. The wireless device of claim 13 wherein:
receiving the first CSI reporting configuration comprises being operable to receive a first CSI resource for a CSI process of the wireless device; and
receiving the second CSI reporting configuration comprises being operable to receive a second CSI resource for the CSI process of the wireless device.

21. The wireless device of claim 20 further operable to:
receive a CSI report request for either the first CSI reporting configuration or the second CSI reporting configuration; and
wherein reporting the CSI report for only one of the first CSI reporting configuration and the second CSI reporting configuration comprises being operable to report the CSI report for the one of the first CSI reporting configuration and the second CSI reporting configuration according to the CSI report request.

22. The wireless device of claim 21 wherein receiving the CSI report request comprises being operable to:
receive a value of "10" to indicate that the CSI report request is for the first CSI reporting configuration; and
receive a value of "11" to indicate that the CSI report request is for the second CSI reporting configuration.

23. The wireless device of claim 13 wherein a port associated with the first CSI reporting configuration and a port associated with the second CSI reporting configuration can always be assumed to be quasi-collocated.

24. The wireless device of claim 13 wherein the wireless device does not expect to receive the first CSI reporting configuration and the second CSI reporting configuration that have different values of a higher layer parameter providing quasi-collocation information such as qcl-CRS-Info-r11.

25. A wireless device adapted to:
   receive a first CSI reporting configuration;
   receive a second CSI reporting configuration;
   report an updated CSI report for only one of the first CSI reporting configuration and the second CSI reporting configuration;
   determine a first time instant corresponding to the first CSI reporting configuration;
   determine a second time instant corresponding to the second CSI reporting configuration; and
   calculate the CSI report using the second CSI reporting configuration if the first time instant is not between the second time instant and a third time instant, where the third time instant is later than the second time instant.

* * * * *